United States Patent
Nanba et al.

(10) Patent No.: US 10,902,476 B2
(45) Date of Patent: Jan. 26, 2021

(54) ADVERTISEMENT PROVIDING SYSTEM AND ADVERTISEMENT PROVIDING METHOD

(71) Applicant: GREE, INC., Tokyo (JP)

(72) Inventors: Shohei Nanba, Tokyo (JP); Ryo Shibuya, Tokyo (JP); Takuya Arioka, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 15/691,050

(22) Filed: Aug. 30, 2017

(65) Prior Publication Data
US 2017/0364961 A1    Dec. 21, 2017

Related U.S. Application Data

(62) Division of application No. 14/118,096, filed as application No. PCT/JP2012/003231 on May 17, 2012, now abandoned.

(30) Foreign Application Priority Data

May 17, 2011   (JP) .................................. 2011-110851

(51) Int. Cl.
G06Q 30/02         (2012.01)
G06Q 50/00         (2012.01)

(52) U.S. Cl.
CPC ..... *G06Q 30/0269* (2013.01); *G06Q 30/0251* (2013.01); *G06Q 50/01* (2013.01)

(58) Field of Classification Search
None
See application file for complete search history.

(56) References Cited

U.S. PATENT DOCUMENTS

2008/0022211 A1    1/2008 Jones et al.
2008/0208691 A1    8/2008 Umezawa
(Continued)

FOREIGN PATENT DOCUMENTS

JP   2003-157388 A   5/2003
JP   2007-193613 A   8/2007
(Continued)

OTHER PUBLICATIONS

E. Adam Ostrow, "'Like' it or not, online ads are getting personal", retrieved from http://www.cnn.com/2011/TECH/social.media/01/28/personal.advertising/index.html, available on Jan. 31, 2011, (Year: 2011).*

(Continued)

*Primary Examiner* — Sam Refai
(74) *Attorney, Agent, or Firm* — Pillsbury Winthrop Shaw Pittman, LLP

(57) ABSTRACT

The present invention relates to an advertisement providing system that takes advantage of the comment function of an SNS to expand Internet advertising, such as affiliate advertising, between members. Upon receiving a predetermined notification from an advertiser server, an SNS site control unit identifies a first user identifier associated with a second user identifier included in the notification and transmits, as content data, comment data including user information pertaining to a user of a second communication terminal and link information for a commercial website to a first communication terminal to which is allocated the identified first user identifier.

9 Claims, 23 Drawing Sheets

(56) References Cited

U.S. PATENT DOCUMENTS

| | | | |
|---|---|---|---|
| 2009/0182589 A1* | 7/2009 | Kendall | G06Q 30/0601 |
| | | | 705/5 |
| 2010/0179868 A1* | 7/2010 | del Rosario | G06Q 30/0214 |
| | | | 705/14.16 |
| 2011/0218846 A1 | 9/2011 | Fieldman et al. | |
| 2012/0184363 A1 | 7/2012 | Barclay et al. | |
| 2012/0226544 A1* | 9/2012 | Merrifield | G06Q 50/01 |
| | | | 705/14.27 |
| 2013/0011383 A1* | 1/2013 | Lizano | A61P 11/06 |
| | | | 424/115 |
| 2013/0144706 A1* | 6/2013 | Qawami | G06Q 30/0226 |
| | | | 705/14.27 |
| 2013/0204954 A1 | 8/2013 | Kendall et al. | |

FOREIGN PATENT DOCUMENTS

| | | |
|---|---|---|
| JP | 2007-317177 A | 12/2007 |
| JP | 2008-210304 A | 9/2008 |
| JP | 2008-243008 A | 10/2008 |
| JP | 2008-282305 A | 11/2008 |
| JP | 2009-545076 A | 12/2009 |
| JP | 2011-504260 A | 2/2011 |
| JP | 2011-76140 A | 4/2011 |
| JP | 2011-90439 A | 5/2011 |

OTHER PUBLICATIONS

Mar. 3, 2015 Office Action issued in Japanese Patent Application No. 2013-244204.
Mar. 15, 2016 Office Action issued in Japanese Patent Application No. 2015-103791.
Aug. 19, 2014 Office Action issued in Japanese Patent Application No. 2013-244204.
Aug. 14, 2012 Search Report issued in International Patent Application No. PCT/JP2012/003231.
Jan. 22, 2013 Notification of Reasons for Refusal issued in Japanese Patent Application No. 2011-110851.
Apr. 23, 2013 Notification of Reasons for Refusal issued in Japanese Patent Application No. 2013-076621.
Jul. 2, 2013 Notification of Reasons for Refusal issued in Japanese Patent Application No. 2013-076621.
Jul. 30, 2013 Notification of Reasons for Refusal issued in Japanese Patent Application No. 2013-129996.

* cited by examiner

FIG. 2

| User identifier 201 | Username 202 | Password 203 | Name 204 | E-mail address 205 | Related user identifier 206 | Points 207 |
|---|---|---|---|---|---|---|
| UID001 | Takuya | 12bcdeaa | Takuya Tanaka | abcd@xxx.ne.jp | UID002 UID003 UID005 | 430 |
| UID002 | Shingo | 3513bacd | Shingo Kobayashi | efgh@xxx.ne.jp | UID001 UID004 UID007 | 150 |
| UID003 | Nami | B125ixyz | Nami Kishibe | ijk@xxx.ne.jp | UID001 | 0 |
| ... | ... | ... | ... | ... | ... | ... |

FIG. 4

| Comment identifier 401 | User identifier 402 | Username 403 | Comment text data 404 | Post time 405 |
|---|---|---|---|---|
| CID00125 | UID001 | Takuya | Great, it's sunny! | 3/22 6:30 |
| CID00124 | UID003 | Nami | Might have to postpone tomorrow's fishing trip? | 3/21 20:30 |
| CID00123 | UID001 | Takuya | I'm worried about the weather tomorrow... | 3/21 18:20 |
| CID00122 | UID005 | Yoshikazu | Going out for a drink now! | 3/21 18:00 |
| CID00121 | UID002 | Shingo | I'm hungry | 3/21 17:50 |
| CID00120 | UID001 | Takuya | Done with work! | 3/21 17:30 |
| CID00119 | UID004 | Mayumi | Cute cat. | 3/21 12:15 |
| ... | ... | ... | ... | ... |

| User identifier (901) | Advertisement identifier (902) | Time of execution (903) | Performance reward granting status (904) |
|---|---|---|---|
| UID001 | AID001 | 3/22 10:00 | Not granted |
| UID002 | AID003 | 3/22 9:30 | Granted |
| UID003 | AID002 | 3/22 7:45 | Granted |
| UID002 | AID002 | 3/21 22:00 | Granted |
| UID005 | AID005 | 3/20 21:00 | Granted |
| ⋮ | ⋮ | ⋮ | ⋮ |

| Advertisement identifier (1001) | Performance reward points (1002) |
|---|---|
| AID001 | 500 |
| AID002 | 100 |
| AID003 | 200 |
| AID004 | 300 |
| AID005 | 50 |
| ⋮ | ⋮ |

| 1101 | 1102 | 1103 |

| Advertisement identifier | Advertiser site URL | Comment text data |
|---|---|---|
| AID001 | http://URL001/ | I got 500 points during a campaign! Get some points with me ♪ http://URL001/ |
| AID002 | http://URL002/ | I got 100 points for registering as a member! Come on and register, everyone! http://URL002/ |
| ⋮ | ⋮ | ⋮ |

| Comment identifier | User identifier | Username | Comment text | Post time |
|---|---|---|---|---|
| CID00126 | UID001 | Takuya | I got 500 points during a campaign! Get some points with me ♪ http://URL001/ | 3/22 10:10 |
| CID00125 | UID001 | Takuya | Great, it's sunny! | 3/22 6:30 |
| CID00124 | UID002 | Nami | Might have to postpone tomorrow's fishing trip? | 3/21 20:30 |
| ... | ... | ... | ... | ... |

| Advertiser identifier | Performance reward points | Additional performance reward points |
|---|---|---|
| AID001 | 500 | 300 |
| AID002 | 100 | 50 |
| AID003 | 200 | ... |
| AID004 | 300 | ... |
| AID005 | 50 | ... |
| ⋮ | ⋮ | ⋮ |

| | 1701 | 1702 | 1703 | 1704 | 1705 | 1706 | 1707 | 1708 |
|---|---|---|---|---|---|---|---|---|
| | Advertisement identifier | Advertiser server URL | Starting period | Ending period | Prescribed number of participating users | Current number of participating users | Comment text data | Post-satisfaction comment text data |
| | AID001 | http://URL001/ | April 1, 2011 0:00 | May 1, 2011 0:00 | 500 | 423 | I got 500 points during a campaign! 300 more points after (prescribed number of participating users - current number of participating users) more people register! Campaign lasts until 5/10, 22:00! Get some points with me ♪ http://URL001/ | 500 new registrations!! You normally get 500 points for registering at the linked site, but now earn 800 ♪ Campaign lasts until 5/10, 22:00! http://URL001/ |
| | AID002 | http://URL002/ | June 1, 2011 0:00 | August 1, 2011 0:00 | 200 | 451 | I got 100 points by registering as a member! 50 more points after (prescribed number of participating users - current number of participating users) more people register! Come on and register, everyone! Campaign lasts until 5/20, 15:00! Get some points with me ♪ http://URL002/ | 200 new registrations!! You normally get 100 points for registering at the linked site, but now earn 150 ♪ Campaign lasts until 5/20, 15:00! http://URL002/ |
| | ... | ... | ... | ... | ... | ... | ... | ... |

| Advertisement identifier 1801 | Registered user identifier 1802 | Acceptance or rejection of comment display 1803 | Granting status of additional performance reward provision 1804 |
|---|---|---|---|
| AID001 | UID001 | Accept | Not granted |
| AID001 | UID002 | Reject | Not granted |
| AID002 | UID002 | Accept | Not granted |
| AID002 | UID003 | Accept | Not granted |
| ... | ... | ... | ... |

| Advertisement identifier 1801 | Registered user identifier 1802 | Acceptance or rejection of comment display 1803 | Additional reward granting status 2204 |
|---|---|---|---|
| AID001 | UID001 | Accept | Granted |
| AID001 | UID002 | Reject | Granted |
| AID002 | UID002 | Accept | Not granted |
| AID002 | UID003 | Accept | Not granted |
| ... | ... | ... | ... |

| Comment identifier | User identifier | Username | Post-satisfaction comment text data | Post time |
|---|---|---|---|---|
| CID00129 | UID001 | Takuya | 500 new registrations!! You normally get 500 points for registering at the linked site, but now earn 800 ♪ Campaign lasts until 5/10, 22:00! http://URL001/ | 3/30 20:00 |
| ... | ... | ... | ... | ... |

2300

ADVERTISEMENT PROVIDING SYSTEM AND ADVERTISEMENT PROVIDING METHOD

CROSS REFERENCE TO RELATED APPLICATION

This application is a divisional application of U.S. patent application Ser. No. 14/118,096, filed on Nov. 15, 2013, which is a national stage entry of PCT/JP2012/003231, filed May 17, 2012, which claims priority to and the benefit of Japanese Patent Application No. 2011-110851 filed on May 17, 2011. The entire contents of each of the above are incorporated herein by reference.

TECHNICAL FIELD

The present invention relates to an advertisement providing system.

BACKGROUND ART

In recent years, as a means for providing advertisements related to goods and services (hereinafter referred to as "goods or the like") for which transactions are conducted over the Internet on a commercial website, affiliate programs have been widely used. By using an affiliate program, an individual, business, or the like that provides goods or services on a commercial website (hereinafter the "advertiser") can reach a wider base of users with interest in the goods through the advertisement carrier's website. Furthermore, an affiliate program is very cost effective, since the advertising rate is normally determined based on performance. A conventional affiliate program providing service is disclosed in JP2007-193613A (PTL 1), for example.

On the other hand, a social networking service (SNS) is an example of a member service for constructing a social network over the Internet. In an SNS, a social network is normally established by posting member profiles and other such information on an SNS site and having members register with each other as friends or the like. Furthermore, in an SNS, a unique webpage is allocated to each member for display of comments posted by the member and by friends via a comment function on the webpage, thus facilitating smooth communication between members. If Internet advertising, beginning with the above-described affiliate programs, can be expanded between members of an SNS using the SNS comment function, a strong advertising effect can be expected.

CITATION LIST

Patent Literature

PTL 1: JP2007-193613A

SUMMARY OF INVENTION

Technical Problem

However, when using the comment function of an SNS to expand Internet advertising, such as affiliate advertising, between members of an SNS, conventionally members/users themselves need to create comments, such as advertising copy, individually. This is cumbersome for members and makes it difficult to create advertisements that attract customers.

In order to resolve the above problems with conventional techniques, the present invention provides an advertisement providing system that takes advantage of the comment function of an SNS to provide advertisements that attract customers without members/users themselves having to enter advertising copy or the like.

Solution to Problem

In order to solve the above problems, an advertisement providing system according to the present invention comprises an advertiser server configured to provide a commercial website for executing a commercial transaction; an SNS server configured to provide an SNS site; a first communication terminal configured to connect to the SNS server; and a second communication terminal configured to connect to the advertiser server; the SNS server comprising: a user management database configured to store a first user identifier allocated to the first communication terminal in association with a second user identifier allocated to the second communication terminal; and an SNS site control unit configured to cause a display unit provided in the first communication terminal to display content data forming the SNS site by transmitting the content data to the first communication terminal; wherein the advertiser server transmits a notification including the second user identifier to the SNS server when the second communication terminal executes predetermined processing on the commercial website provided by the advertiser server, and upon receiving the notification, the SNS site control unit identifies the first user identifier associated with the second user identifier included in the notification and transmits, as the content data, comment data including user information pertaining to a user of the second communication terminal and link information for the commercial website to the first communication terminal to which is allocated the identified first user identifier.

In the advertisement providing system according to the present invention, the SNS control unit transmits an inquiry to the second communication terminal as to whether permission for transmitting the comment data to the first communication terminal is granted, and transmits the comment data to the first communication terminal as the content data upon receiving the notification when, as a result of the inquiry, permission for transmitting the comment data to the first communication terminal is granted.

In the advertisement providing system according to the present invention, the SNS server further comprises a performance reward control unit configured to control performance reward usable on the SNS site, the user management database stores the second user identifier in association with the performance reward granted to the second user identifier, and the performance reward control unit adds a first performance reward to the performance reward granted to the second user identifier when the notification is received, and adds a second performance reward to the performance reward granted to the second user identifier when a predetermined condition is satisfied.

In the advertisement providing system according to the present invention, at least one of the first performance reward and the second performance reward is further included in the comment data.

In the advertisement providing system according to the present invention, the predetermined condition is that a total number of communication terminals executing the predetermined processing on the commercial website reaches a predetermined number.

In the advertisement providing system according to the present invention, the predetermined condition is that the first communication terminal connects to the commercial website based on the link information included in the comment data transmitted to the first communication terminal and the first communication terminal executes predetermined processing on the commercial website.

An SNS server according to the present invention is for providing an SNS site, the SNS server being connected with an advertiser server that provides a commercial website for executing a commercial transaction and with a first communication terminal, the SNS server comprising: a user management database configured to store a first user identifier allocated to the first communication terminal in association with a second user identifier allocated to a second communication terminal that connects to the advertiser server; an SNS site control unit configured to cause a display unit provided in the first communication terminal to display content data forming an SNS site by transmitting the content data to the first communication terminal; and a reception unit configured to receive a notification that includes the second user identifier and is transmitted by the advertiser server when the second communication terminal executes predetermined processing on the commercial website provided by the advertiser server, wherein upon the reception unit receiving the notification, the SNS site control unit identifies the first user identifier associated with the second user identifier included in the notification and transmits, as the content data, comment data including user information pertaining to a user of the second communication terminal and link information for the commercial website to the first communication terminal to which is allocated the identified first user identifier.

A method for Internet advertisement providing according to the present invention is used in an advertisement providing system including an advertiser server that provides a commercial website for executing a commercial transaction, an SNS server that provides an SNS site, a first communication terminal that connects to the SNS server, and a second communication terminal that connects to the advertiser server, the method comprising the steps of: the SNS server storing a first user identifier allocated to the first communication terminal in association with a second user identifier allocated to the second communication terminal; the advertiser server transmitting a notification including the second user identifier to the SNS server when the second communication terminal executes predetermined processing on the commercial website provided by the advertiser server; the SNS server identifying the first user identifier associated with the second user identifier included in the notification upon receipt of the notification; and the SNS server transmitting, as content data forming the SNS site, comment data including user information pertaining to a user of the second communication terminal and link information for the commercial website to the first communication terminal to which is allocated the identified first user identifier, and causing a display unit provided in the first communication terminal to display the comment data.

Advantageous Effect of Invention

The advertisement providing system with the above structure according to the present invention takes advantage of the comment function of an SNS, and an SNS site control unit automatically creates member comments in order to provide advertisements that attract customers without members/users themselves having to enter advertising copy or the like.

BRIEF DESCRIPTION OF DRAWINGS

The present invention will be further described below with reference to the accompanying drawings, wherein:

FIG. 2 illustrates the content of a user management table according to Embodiment 1 of the present invention;

FIG. 4 illustrates the content of a comment management table according to Embodiment 1 of the present invention;

FIG. 9 illustrates the content of a reward applicable process management table according to Embodiment 1 of the present invention;

FIG. 10 illustrates the content of a performance reward management table according to Embodiment 1 of the present invention;

FIG. 11 illustrates the content of an advertisement management table according to Embodiment 1 of the present invention;

FIG. 12 illustrates the content of an updated comment management table according to Embodiment 1 of the present invention;

FIG. 16 illustrates the content of a performance reward management table according to Embodiment 2 of the present invention;

FIG. 17 illustrates the content of an advertisement management table according to Embodiment 2 of the present invention;

FIG. 18 illustrates the content of a participating user management table according to Embodiment 2 of the present invention;

FIG. 22 illustrates the content of an updated participating user management table according to Embodiment 2 of the present invention;

FIG. 23 illustrates the content of an updated comment management table according to Embodiment 2 of the present invention.

DESCRIPTION OF EMBODIMENTS

The following describes embodiments of the present invention.

(1) Embodiment 1

(1.1) Overall Structure of Advertisement Providing System

Figure 1:
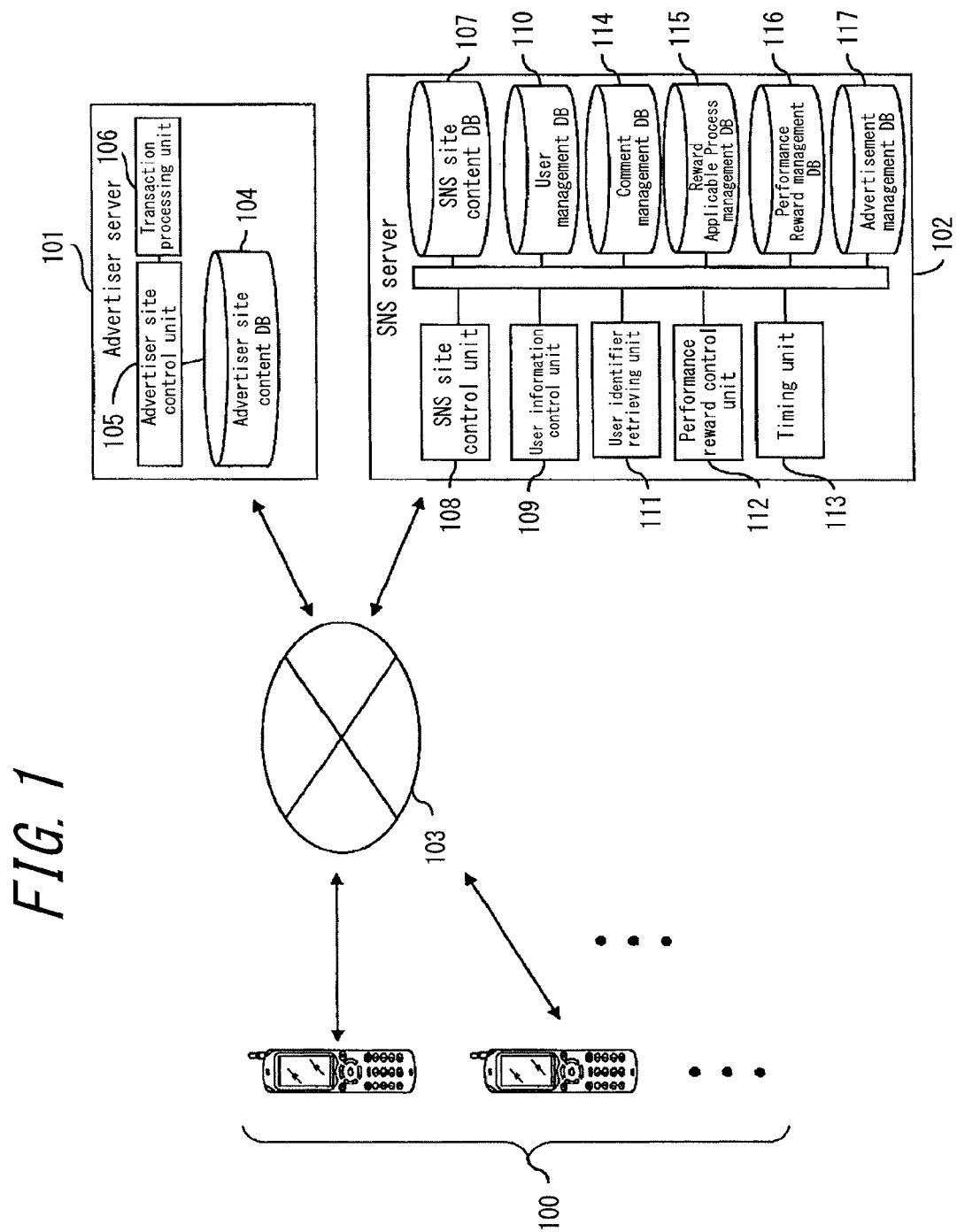
FIG. 1 is a block diagram illustrating the structure of Embodiment 1 of the present invention.

FIG. 1 is a block diagram illustrating the structure of an advertisement providing system according to Embodiment 1 of the present invention. As illustrated in FIG. 1, the advertisement providing system in Embodiment 1 of the present invention includes a plurality of communication terminals 100, an advertiser server 101, and an SNS server 102. The advertiser server 101 is operated by the advertiser and provides a commercial website for goods, services, and the like (hereinafter referred to as "goods or the like"). The SNS server 102 provides a website for a social networking service (SNS) (hereinafter referred to as an "SNS site"). The SNS site carries advertisements by the advertiser for the goods or the like. In other words, the SNS site according to the present invention is a website of an advertisement carrier. The advertiser server 101, the SNS server 102, and the communication terminals 100 are connected to each other over the Internet 103 by a wired and/or wireless connection.

The communication terminal 100 is a communication device connected over the Internet to the advertiser server 101 and the SNS server 102 by a wired and/or wireless connection. The communication terminal 100 is preferably a mobile phone, a tablet terminal, a personal computer, or the like. FIG. 1 shows the case of a mobile phone, but this example is not limiting. The communication terminal 100 includes a wireless communication unit, a display, a keyboard, and the like and sends and receives information to and from servers via the wireless communication unit. For example, the communication terminal 100 receives information constituting a website from the server via the wireless communication unit and displays the website on the display. In this way, a website viewer (hereinafter referred to as a "user") using the communication terminal 100 can view websites. Furthermore, the communication terminal 100 is configured for input of characters, symbols, numbers, and the like via the keyboard into registration forms, login screens, and the like on a variety of websites.

(1.2) Structure of Advertiser Server 101

Next, the structure of the advertiser server 101 is described.

The advertiser server 101 includes an advertiser site content database (DB) 104, an advertiser site control unit 105, and a transaction processing unit 106. The advertiser site content database (DB) 104 stores content data for the commercial website operated by the advertiser and data on goods or services for which transactions are executed on the commercial website. Specifically, the advertiser site content database 104 stores content data such as characters, symbols, numbers, images, videos, and the like constituting a webpage displayed on the commercial website.

The advertiser site control unit 105 controls the content data stored in the advertiser site content database 104 to allow viewing by the user. Specifically, the advertiser site control unit 105 transmits the content data stored in the advertiser site content database 104 to the communication terminal 100 based on a URL transmitted by the communication terminal 100. The transaction processing unit 106 controls the transaction when a user purchases goods or the like on the commercial website.

The transaction processing unit 106 retrieves user information (name, address, contact information, credit card number, user identifier (described below) used on the SNS site, and the like) transmitted by the user's communication terminal 100 on a webpage for purchasing goods or the like and executes transaction processing such as sale of goods, software licensing, service provision (monthly member registration), and the like. The goods or the like may be free, in which case the credit card number need not be retrieved. These transactions are preferably executed with a secure communication protocol such as SSL or TSL. When the completed transaction processing corresponds to a predetermined reward applicable process, the transaction processing unit 106 transmits a performance notification to the SNS server 102 via a communication unit (not illustrated) in the advertiser server 101. The reward applicable process is processing for which points (described below) that can be used on the SNS site are granted when the processing is executed. The performance notification indicates that a predetermined user has executed the reward applicable process. For example, the advertiser server 101 keeps a table storing, in association, an identifier of goods for which advertisements are carried on the SNS site, information indicating transaction processing pertaining to the goods, and an advertisement identifier attached to an advertisement for the goods pertaining to the transaction processing. When the completed transaction processing is stored in this table, the transaction processing unit 106 transmits to the SNS server 102 a performance notification including the advertisement identifier corresponding to the completed transaction processing, the user identifier used on the SNS site, and the time of execution of the transaction processing.

(1.3) Structure of SNS Server 102

The SNS server 102 includes an SNS site content database 107, an SNS site control unit 108, a user information control unit 109, a user management database 110, a user identifier retrieving unit 111, a performance reward control unit 112, a timing unit 113, a comment management database 114, a reward applicable process management database 115, a performance reward management database 116, and an advertisement management database 117.

The SNS site content database 107 stores content data for the SNS site. For example, the content data stored in the SNS site content database 107 is data such as characters, symbols, numbers, images, video, and the like constituting webpages included in the SNS site.

The SNS site control unit 108 controls the SNS site content database 107 and the databases described below so that users can view the SNS site and post and display comments.

The user information control unit 109 issues a user identifier allocated to each communication terminal 100 and associates user identifiers with each other. The user management database 110 stores both the user identifiers issued and those associated with each other by the user information control unit 109.

The user information control unit 109 allocates a user identifier to a user viewing the SNS site based on user preference. A user to whom a user identifier has thus been allocated is hereinafter referred to as a "member/user". The user identifier is different for each member/user and is formed by characters, symbols, numbers, and the like identifying the member/user, for example such as "UID001". The user may be allowed to select a desired user identifier, or the username may be used as the user identifier.

The user information control unit 109 preferably transmits a new user registration form to the communication terminal 100 based on a request from the communication terminal 100. The new user registration form is configured to allow for input of user information (username, name, e-mail address, and the like) and a password that the user wishes to newly register. Upon receiving the user information and password transmitted by the communication terminal 100, the user information control unit 109 verifies whether the same e-mail address as the e-mail address included in the received user information is already registered by referring to the user management database 110. As a result of verification, if the same e-mail address is not registered, the user information control unit 109 stores the received user information and password in the user management database 110. The user information control unit 109 allocates user identifiers as sequential numbers in the order of storage in the user management database 110. For example, different identifiers are allocated to users by allocating "UID001" to the first user stored in the user management database 110 and "UID002" to the next user. Note that when a terminal using a plurality of e-mail addresses is used as the communication terminal 100, a user identifier can be allocated uniquely to the communication terminal 100 by confirming an identifier unique to the terminal in addition to the e-mail address.

Based on a request from the communication terminal 100, the user information control unit 109 also associates user identifiers that have been allocated to users with each other. Here, "associates user identifiers . . . with each other" refers to storing a second user identifier in the user management database 110 as user information related to a first user identifier. Upon a request from the user's communication terminal 100 to register a related user, the user information control unit 109 preferably transmits a related user registration form. The related user registration form is configured to allow a first user to input the user identifier of a second user (second user identifier) whom the first user wishes to register as a related user. The first user inputs the second user identifier via the related user registration form, and the input second user identifier is transmitted to the SNS server 102. The user information control unit 109 retrieves the input second user identifier and associates the second user identifier as user information related to the first user. In this way, a member/user can for example register a friend as a related user. Note that the information that can be input with the related user registration form is not limited to a user identifier and may be a username, e-mail address, or a combination thereof. Furthermore, when storing a second user identifier in the user management database 110 as user information related to a first user identifier, the first user identifier may be stored as user information related to the second user identifier.

The method of registering related users is not limited to the above method. An alternative example is to allow for the users registered on the SNS site and their user information to be searched and to allow a request to register a related user to be made by accessing, from search results, the page on which the profile of a user is displayed and clicking on a related user request button provided on the page.

FIG. 2 illustrates the user identifiers, and user information associated therewith, stored in the user management database 110 by the user information control unit 109. A variety of information is stored in the user management database 110 preferably in the form of a user management table 200.

The user identifier is stored in the first column 201 of the user management table 200, and the user information is stored from the second column onwards. The username is stored in the second column 202, the password is stored in the third column 203, each user's name is stored in the fourth column 204, each user's e-mail address is stored in the fifth column 205, and any associated user identifiers are stored in the sixth column 206. The number of points each user has is stored in the seventh column 207. In the user management table 200 illustrated in FIG. 2, the username, password, name, e-mail address, associated user identifiers, and points that are stored in association with the user identifier "UID001", for example, are respectively "Takuya", "12bcdeaa", "Takuya Tanaka", "abcd@xxx.ne.jp", "UID002, UID003, UID005", and "430 points". Note that the information stored in the user management table 200 is not limited to the above information. For example, information such as place of birth, age, address, and the like may be stored.

The "points" referred to here are a privilege that can be exchanged for goods, services, or cash, or that provide a discount when purchasing goods or services. Points are granted by the performance reward control unit 112 when a user registers as a member/user on the SNS site or executes predetermined processing such as purchasing goods or using services on the SNS site. The goods that can be exchanged for points are, for example, music data, image data, game software, and the like.

The user identifier retrieving unit 111 retrieves the user identifier allocated to a user when the user views the SNS site using the communication terminal 100. For example, the user identifier retrieving unit 111 retrieves the user's user identifier by causing the user to transmit predetermined information (user identifier, username, e-mail address, or the like, together with a password) to the SNS server 102 by inputting the information, using the communication terminal 100, into a login form provided on the SNS site.

The user identifier retrieving unit 111 compares the user identifier and password retrieved from the communication terminal 100 with the user identifier and password stored in the user management database 110, transmitting the user identifier to the SNS site control unit 108 if the user identifier and password match. The SNS site control unit 108 transmits content data for the user's unique webpage (hereinafter referred to as a "personal page") to the communication terminal 100 based on the user identifier. As a result, the personal page is displayed on the display of the communication terminal 100.

The performance reward control unit 112 controls the usable number of points within the SNS site for each user identifier. The performance reward control unit 112 grants a predetermined number of points to a user upon receipt of a performance notification. Based on control by the SNS site control unit 109, the timing unit 113 records the time at which each user makes a comment. The timing unit 113 may also record other times, such as the time at which a performance notification is received.

The comment management database 114 stores comments posted by users. The reward applicable process management database 115 stores information on a user when the user executes reward applicable process. The performance reward management database 116 stores information on points granted by the performance reward control unit 112 when a performance notification is received. The advertisement management database 117 stores a variety of information on advertisements which are carried on the SNS site. The information stored in these databases is described in detail along with the operations below.

(1.4) Operations of Advertisement Providing System

Figure 3:
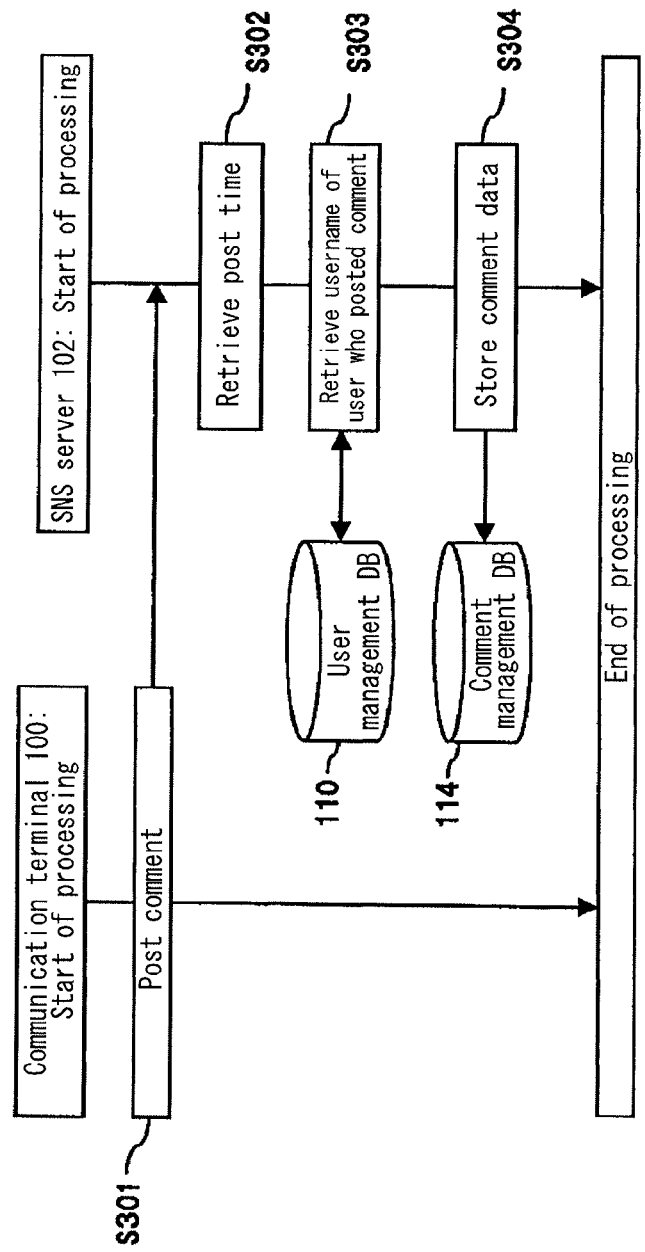
FIG. 3 illustrates operations for comment posting according to Embodiment 1 of the present invention.
Figure 5:
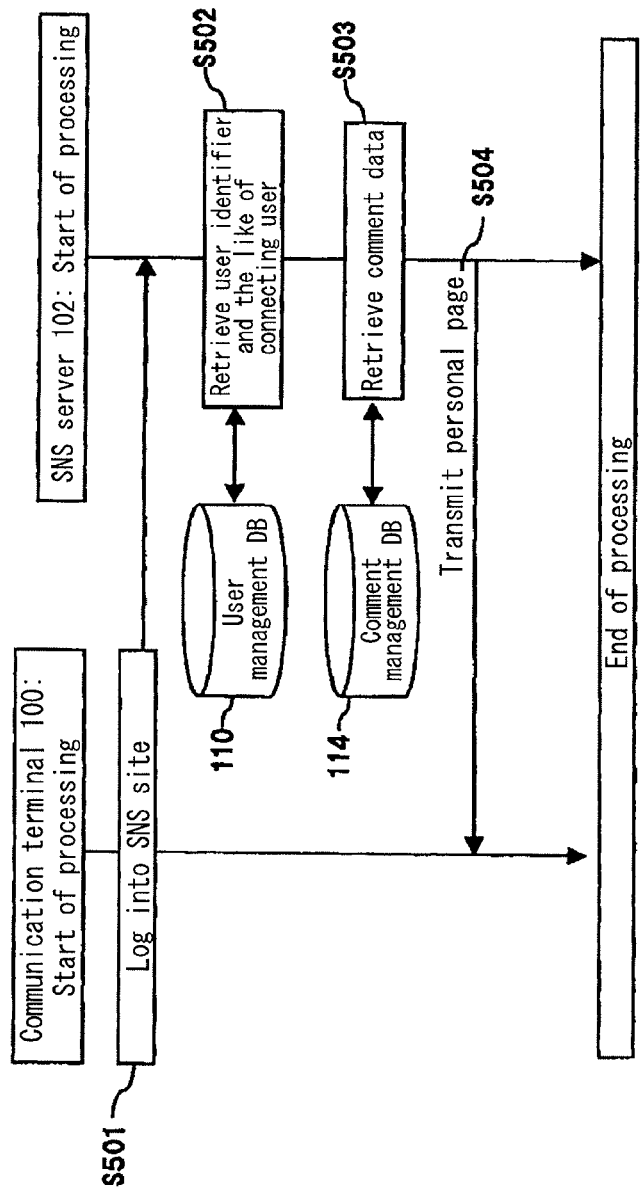
FIG. 5 illustrates operations to display a comment according to Embodiment 1 of the present invention.
Figure 8:
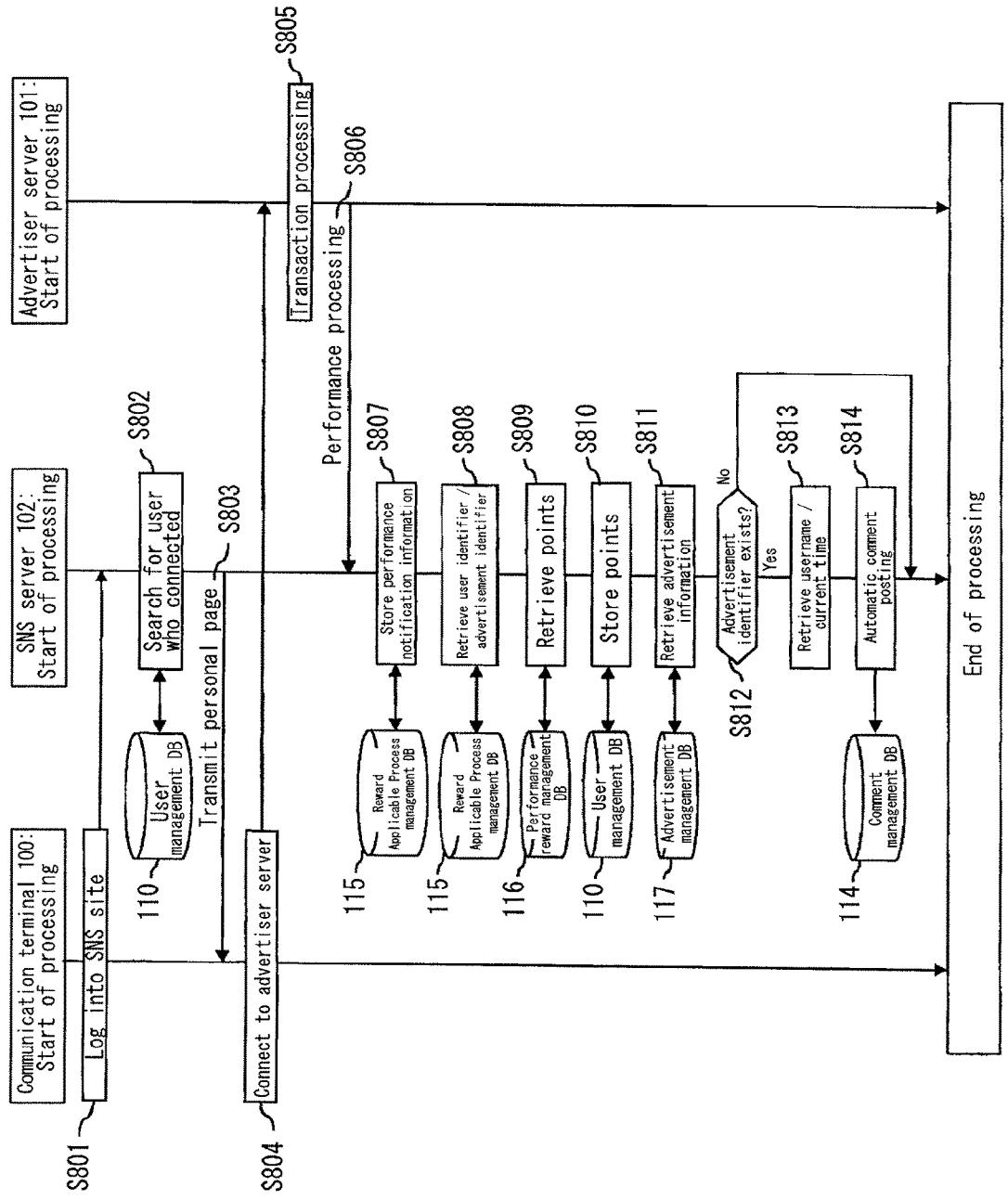
FIG. 8 is a flowchart illustrating operations of an advertisement providing system according to Embodiment 1 of the present invention.

Next, operations by the advertisement providing system in Embodiment 1 are described with reference to FIGS. 3, 5, and 8. FIG. 3 illustrates operations for comment posting, FIG. 5 illustrates operations for displaying a comment, as FIG. 8 illustrates operations for automatic comment posting executed when reward applicable process is executed. The operations below are described assuming that the user management table 200 illustrated in FIG. 2 has been stored in the user management database 110 of the SNS server 102 in advance by new user registration and related user registration.

(1.4.1) Operations for Posting a Comment

First, FIG. 3 displays operations when the communication terminal 100 transmits a comment to the SNS server 102 by user input operation. In step S301, the communication terminal 100 first transmits text data (hereinafter referred to as "comment text data") including the user identifier and the comment to the SNS server 102 based on the user input operation. Upon the SNS server 102 receiving the data, the SNS site control unit 108 refers to the timing unit 113 to retrieve the time of receipt of the data as the post time (step S302). The user identifier is described here as being "UID001", the comment text data as "Great, it's sunny!", and the post time as "3/22 6:30". Next, the SNS site control unit 108 retrieves the username of the user who posted the comment (step S303). Specifically, the SNS site control unit 108 refers to the user management database 110 to retrieve the username corresponding to the user identifier. In this case, the SNS site control unit 108 retrieves the username "Takuya" corresponding to "UID001". Finally, in step S304, the SNS site control unit 108 stores comment data including the user identifier, username, comment text data, and post time in the comment management database 114, thus concluding operations for comment posting.

FIG. 4 illustrates information on comments that the SNS site control unit 108 stores in the comment management database 114. A variety of information is stored in the comment management database 114 preferably in the form of a comment management table 400.

A comment identifier that uniquely identifies a comment is stored in the first column 401 of the comment management table 114, and the user identifier is stored in the second column 402. The username is stored in the third column 403, and the comment text data posted by the user is stored in the fourth column 404. The post time at which the comment was posted is stored in the fifth column 405. In this case, the comment that was transmitted as described above is stored in the line for the comment identifier "CID00125".

(1.4.2) Operations for Displaying a Comment

FIG. 5 illustrates operations by which the SNS site control unit 108 displays a comment on a personal page. First, in step S501, on the homepage of the SNS site, the communication terminal 100 transmits a login request to the SNS server 102 based on user input. The following describes the case of the user identifier and password being included in the login request, but instead of the user identifier, the username may be included in the login request.

Upon the SNS server 102 receiving a login request, the user identifier retrieving unit 111 compares the received user identifier and password with the user management database 110 (step S502). As a result of comparison, if the retrieved user identifier and password match a predetermined user identifier and password stored in the user management database 110, the user identifier retrieving unit 111 transmits the user identifier to the SNS site control unit 108. The matching user identifier is described here as being "UID001" (i.e. the username "Takuya").

In the following step S503, the SNS site control unit 108 retrieves from the comment management database 114 a plurality of pieces of comment data (username, comment text data, post time, and the like) for comments by the user identifier "UID001" and related users of "UID001" in order, starting from the newest. Based on the content data included in the retrieved comment data, the SNS site control unit 108 builds a personal page for user identifier UID001 and transmits the personal page to the user terminal 100, thus concluding operations for displaying a comment (step S504).

Figure 6:
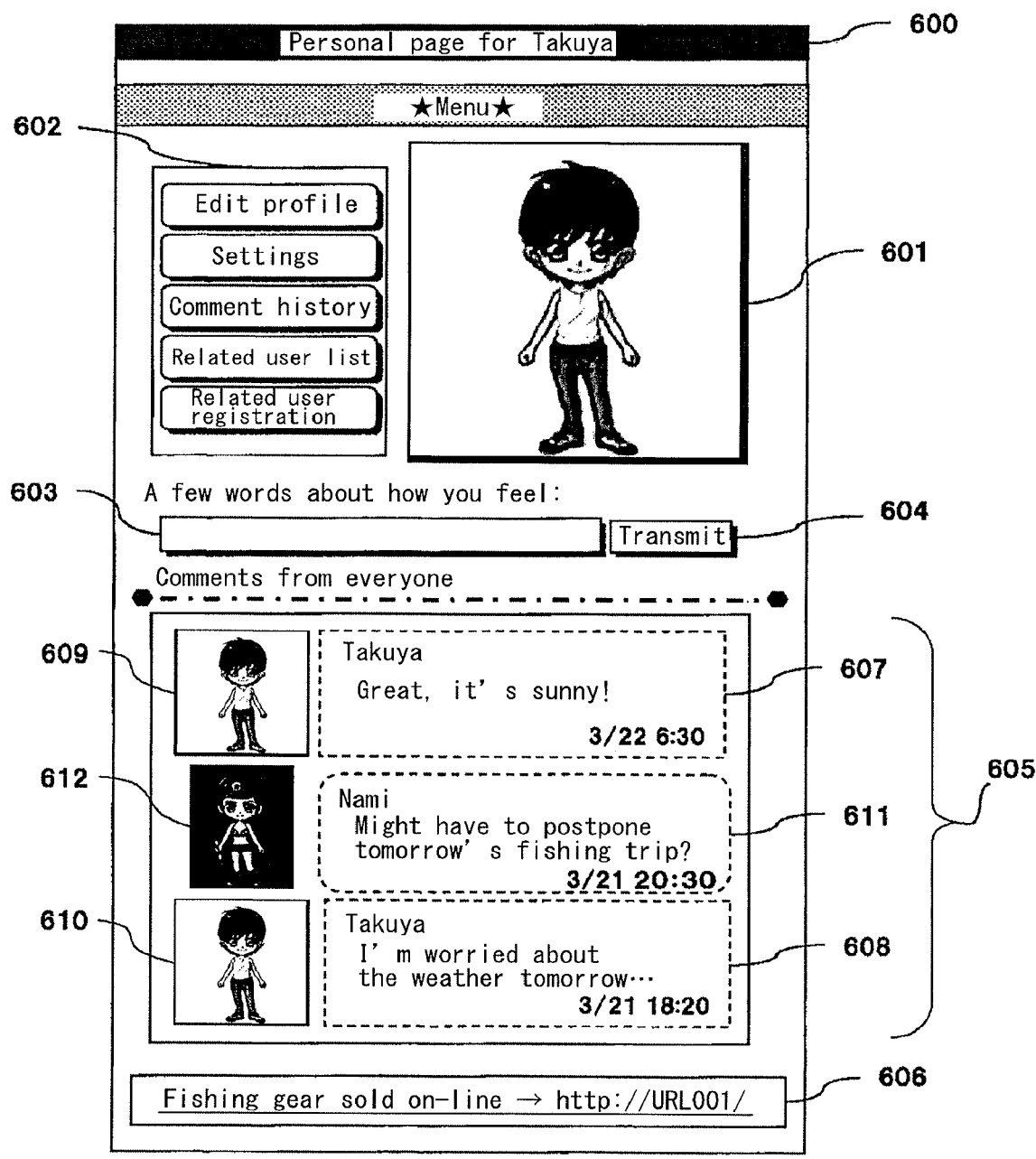
FIG. 6 illustrates an example of displaying a personal page according to Embodiment 1 of the present invention.

FIG. 6 illustrates an example of comment data and other content data that is controlled by the SNS site control unit 108, transmitted to the communication terminal 100, and displayed as a personal page 600 for "Takuya", the member/user whose user identifier is "UID001". At the top of the personal page 600, an avatar display region 601 displaying an avatar, photograph, or image of "Takuya", a menu region 602 displaying menu icons for changing settings, a comment input form 603 for inputting and transmitting a comment, and a transmission button 604 are provided. At approximately the middle of the personal page 600, a comment display region 605 displaying comments posted by the user and related users is provided. Furthermore, at the bottom of the personal page 600, an advertisement display region 606 displaying advertisements by the advertiser server for goods or the like is provided. The positions for display are not, however, limited to the above positions. For example, the advertisement display region 606 may be provided at the top, the left side, or the right side of the personal page 600.

When a member/user clicks on any of the menu icons displayed in the menu region 602, a webpage corresponding to the menu is displayed. For example, when the profile editing icon is clicked, the user can change a portion or the entirety of the user information that has already been transmitted via the new user registration form and stored in the user management database 110. Additionally, a variety of setting icons, a comment history icon for displaying past comment history, a related user list icon for displaying a list of related users, and a related user registration icon for registering a related user are illustrated in FIG. 6. The displayed menu icons are not, however, limited in this way. For example, a password change icon, a member search icon for searching for other members/users, and the like may be displayed.

The comment input form 603 and the transmission button 604 allow a member/user to post a comment on a personal page using the communication terminal 100. A comment is formed by characters, symbols, images, and the like and is a way for a member/user to express an opinion or to explain something. After the user enters a comment into the comment input form 603 and clicks on the transmission button 604, the comment is transmitted to the SNS server 102, and via the operations illustrated in FIG. 3, data for the comment are stored in the comment management database 114.

An advertising banner, text advertisement, and the like are displayed in the advertisement display region 606 of FIG. 6. Link information for connecting to the commercial website provided by the advertiser server and an advertisement identifier are associated with the advertising banner, text advertisement, and the like. Link information is preferably constituted by the advertiser server's address (for example, a URL). The URL of the advertiser server is described here as being http://URL001/. Below, the case in which the link information is the URL of the advertiser server is described, yet the link information may further include link information for connecting to a particular webpage displayed on the commercial website. For example, the link information may include the address of a webpage that introduces particular goods.

In the comment display region 605 in FIG. 6, comments 607 and 608 by member/user "Takuya" and avatars 609 and 610 for "Takuya" are displayed. A comment is thus displayed in combination with the member/user's avatar, making it easy to recognize which member/user posted the comment. On the personal page for member/user "Takuya", a comment 611 for "Nami", who is registered as a related user for Takuya, is displayed along with Nami's avatar 612. These comments 607, 608, and 611 are retrieved from the comment management database 114, respectively have the times 3/22 6:30, 3/21 20:30, and 3/21 18:20, and are displayed in the comment region 605 in order from top to bottom starting with the newest comment. Note that in FIG. 3, only three comments are shown, yet the total number of comments displayed is not limited to three. Furthermore, the comments may be displayed in order from the oldest comment, or a certain number of past comments may be displayed starting with the most recent comment.

Figure 7:
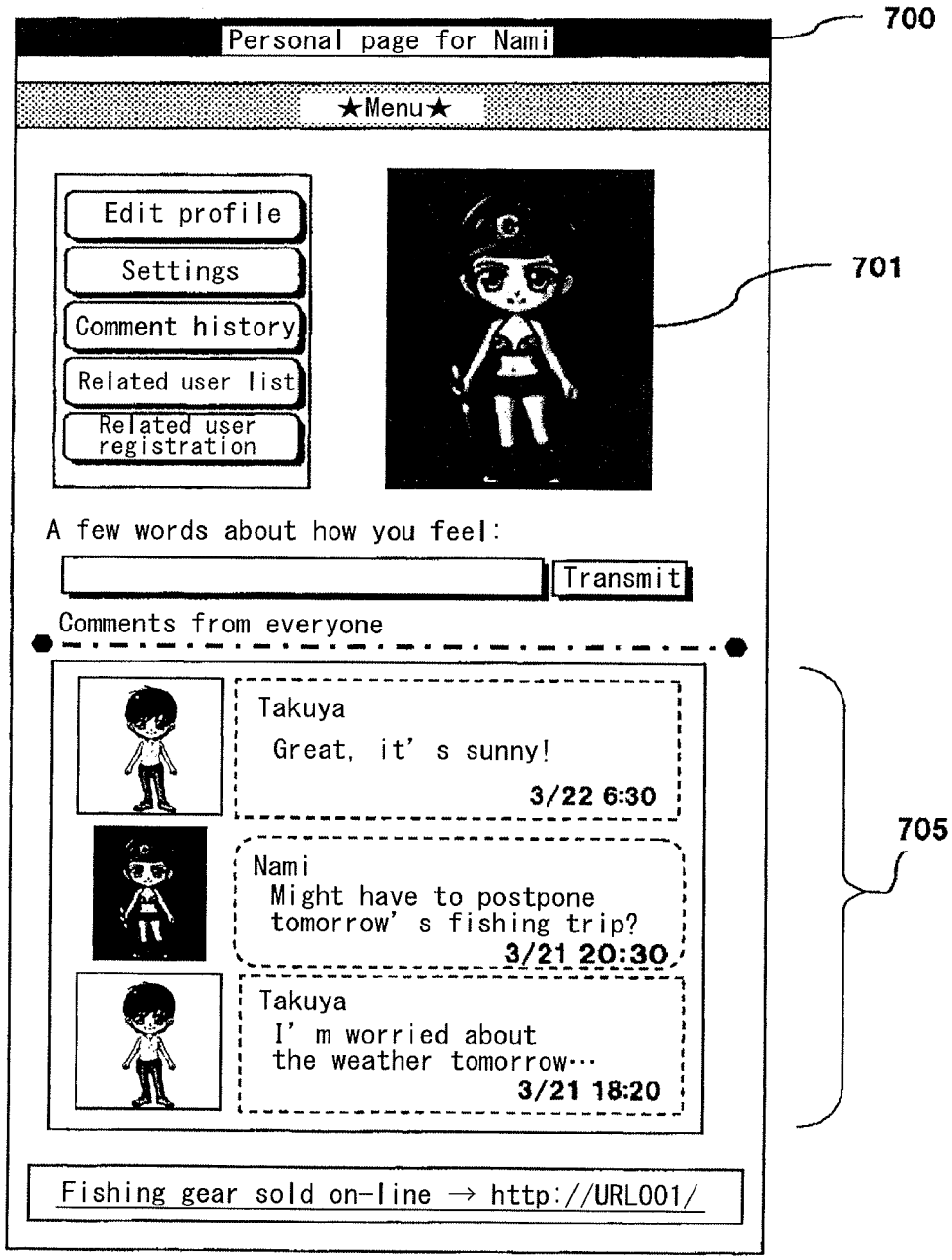
FIG. 7 illustrates an example of a displaying a personal page of a related user according to Embodiment 1 of the present invention.

FIG. 7 illustrates a personal page 700 for member/user "Nami", registered as a related user for "Takuya". A description of portions similar to FIG. 6 is omitted. The avatar for user "Nami" is displayed in an avatar display region 701, and a comment by member/user "Nami" and comments by "Takuya", who is a related user for "Nami", are displayed in a comment display region 705. On the personal page for each member/user, comments by that member/user and related users are displayed, which is a useful way for members/users to communicate with each other, as illustrated in FIGS. 6 and 7.

Note that while "Takuya" only appears as a related user for "Nami" in the example in FIG. 7, comments by "Takuya" are also similarly displayed in the comment display region of any other users for whom "Takuya" is registered as a related user.

(1.4.3) Operations for Automatic Comment Posting

FIG. 8 illustrates operations by the advertisement providing system for automatic comment posting. Automatic comment posting is executed when reward applicable process is executed by the communication terminal 100. First, in step S801, on the homepage of the SNS site, the communication terminal 100 transmits a login request based on user input to the SNS server 102. The following describes the case of the user identifier and password being included in the login request, but instead of the user identifier, the username may be included in the login request.

Upon the SNS server 102 receiving a login request, the user identifier retrieving unit 111 compares the received user identifier and password with the user management database 110 (step S802). As a result of comparison, if the retrieved user identifier and password match a predetermined user identifier and password stored in the user management database 110, the user identifier retrieving unit 111 transmits the user identifier to the SNS site control unit 108. The matching user identifier is described here as being "UID001" (i.e. the username "Takuya"). The SNS site control unit 108 transmits the personal page 600 for the user identifier UID001 to the user terminal 100 (step S803).

Next, in step S804, when the member/user "Takuya" clicks on the advertising banner or the like displayed in the advertisement region 317 of the personal page 300, the communication terminal 100 connects to the advertiser server 101. In step S805, the transaction processing unit 106 executes transaction processing in communication with the communication terminal 100. Upon completion of the transaction processing, if the transaction processing corresponds to predetermined reward applicable process, the advertiser server 101 transmits a performance notification to the SNS server 102 (step S806). The performance notification includes the user identifier of the user of the communication terminal 100 that executed the transaction processing corresponding to the reward applicable process, the advertisement identifier allocated to the advertisement for the goods pertaining to the transaction processing, and the time of execution of the transaction processing. With this performance notification, the SNS server 102 can determine that the communication terminal 100 has executed reward applicable process.

Upon receiving the performance notification, the performance reward control unit 112 stores information pertaining to the performance notification in the reward applicable process management database 115 in step S807. FIG. 9 illustrates a reward applicable process management table 900 stored in the reward applicable process management database 115. A user identifier is stored in the first column 901 of the reward applicable process management table 900, and an advertisement identifier is stored in the second column 902. The user identifier in the first column 901 is the user identifier included in the performance notification, and the advertisement identifier stored in the second column 902 is the advertisement identifier included in the performance notification. Note that the advertisement identifier is an identifier for uniquely identifying an advertisement and is allocated to each advertisement for goods pertaining to transaction processing. The time of execution of the transaction included in the performance notification is stored in the third column 903, and a status indicating whether points have been granted to the user corresponding to the user identifier is stored in the fourth column 904. It is assumed here that a performance notification is received for an advertisement pertaining to user identifier "UID001" and advertisement identifier "AID001". Furthermore, the time of execution of the transaction processing is described here as being "3/22 10:00".

Next, in step S808, the performance reward control unit 112 refers to the reward applicable process management database 115 to retrieve a combination of a user identifier and an advertisement identifier for which the reward granting status is "not granted". In this case, the user identifier "UID001" and the advertisement identifier "AID001" are retrieved as the combination for which the reward granting status is "not granted".

In the following step S809, the performance reward control unit 112 refers to the performance reward management database 116 to retrieve the number of points for the advertisement identifier "AID001" for which the reward granting status was "not granted". FIG. 10 illustrates a performance reward management table 1000 stored in the performance reward management database 116. An advertisement identifier is stored in the first column 1001 of the performance reward management table 1000, and the number of points is stored in the second column 1002. In this case, the performance reward control unit 112 retrieves 500 points as the number of points for the advertisement identifier "AID001".

Next, in step S810, the performance reward control unit 112 grants points to the user. Specifically, the performance reward control unit 112 adds the number of points retrieved in step S809 to the points held by the user identifier "UID001" retrieved in step S808. In other words, 500 points are added to the points of the user identifier "UID001" stored in the user management database 110. As a result, the number of points held by the user "Takuya" becomes 930.

Next, the SNS site control unit 108 refers to the advertisement management database 117 to retrieve information pertaining to the advertisement identifier "AID001" (step S811). FIG. 11 illustrates an advertisement management table 1100 stored in the advertisement management database 117. The advertisement management table 1100 stores, in association, an advertisement identifier, link information for connecting to the commercial website provided by the advertiser server, and comment text data made up of a predetermined character sequence. In Embodiment 1, the advertisement identifier is stored in the first column 1101 and the URL of the advertiser's site is stored as the link information in the second column 1102 of the advertisement management table 1100. The comment text data is stored in the third column 1103. The comment text data includes at least link information for connecting to the commercial website provided by the advertiser server. The comment text data may further include the number of points corresponding to the associated advertisement identifier. In other words, in step S811, the SNS site control unit 108 retrieves at least the comment text data corresponding to the advertisement identifier retrieved in step S808 and proceeds to step S813. Note that the information stored in the advertisement management database 117 is not limited to the above information and may include the advertiser's name, advertised goods, term of validity of the advertisement, and the like, and the SNS site control unit 108 may retrieve these pieces of information in addition to the comment text data.

The SNS site control unit 108 terminates processing when the advertisement identifier retrieved in step S808 does not exist in the advertisement management database 117 (step S812). In this case, since the advertisement identifier "AID001" is stored in the advertisement management database 117, processing proceeds to step S813.

In the following step S813, the SNS site control unit 108 refers to the user management database 110 to retrieve the username corresponding to the user identifier retrieved in step S808 and refers to the timing unit 113 to retrieve the current time "3/22 10:10" as the post time. In step S814, the SNS site control unit 108 stores automatic comment data in the comment management database 114. The automatic comment data includes the user identifier retrieved in step S808, the username and post time retrieved in step S813, and the comment text data retrieved in step S811. FIG. 12 illustrates a comment management table 1200 in which comments have been stored by the SNS site control unit 108. As illustrated in FIG. 12, "Takuya: I got 500 points during a campaign! Get some points with me ♪ http://URL001/" is stored in the comment management database 114 as a comment for user identifier "UID001". The comment is stored in this way by the SNS site control unit 108 when a performance notification is received from the advertiser server 101, and therefore users need not manually post comments by filling out the comment input form 603 provided on the personal page and pressing the transmission button 604. Accordingly, to users it appears that this comment has been posted and displayed automatically in the comment display region of the personal page for user identifier "UID001" and of the personal page of related users.

Figure 13:
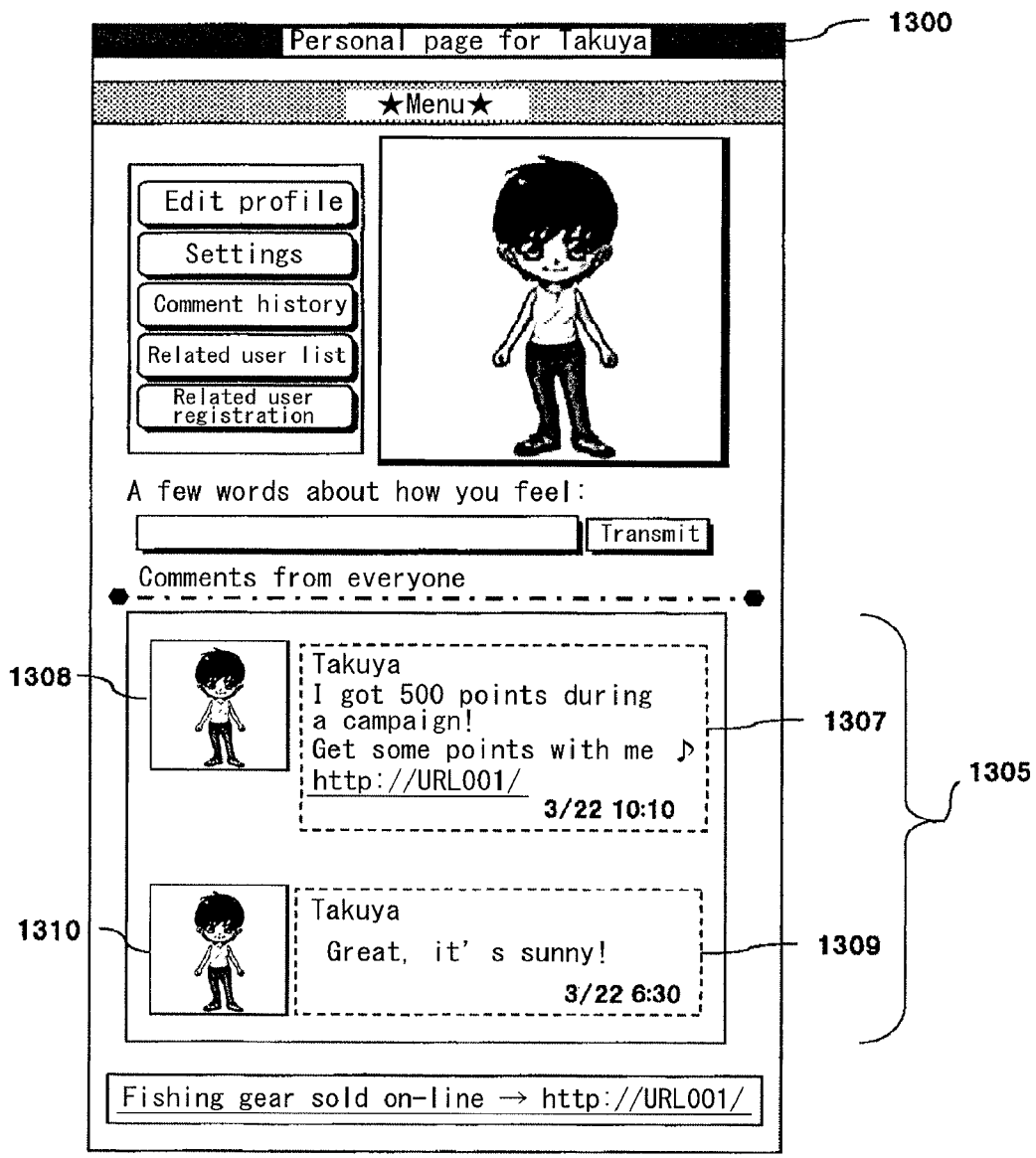
FIG. 13 illustrates an example of displaying an updated personal page according to Embodiment 1 of the present invention.
Figure 14:
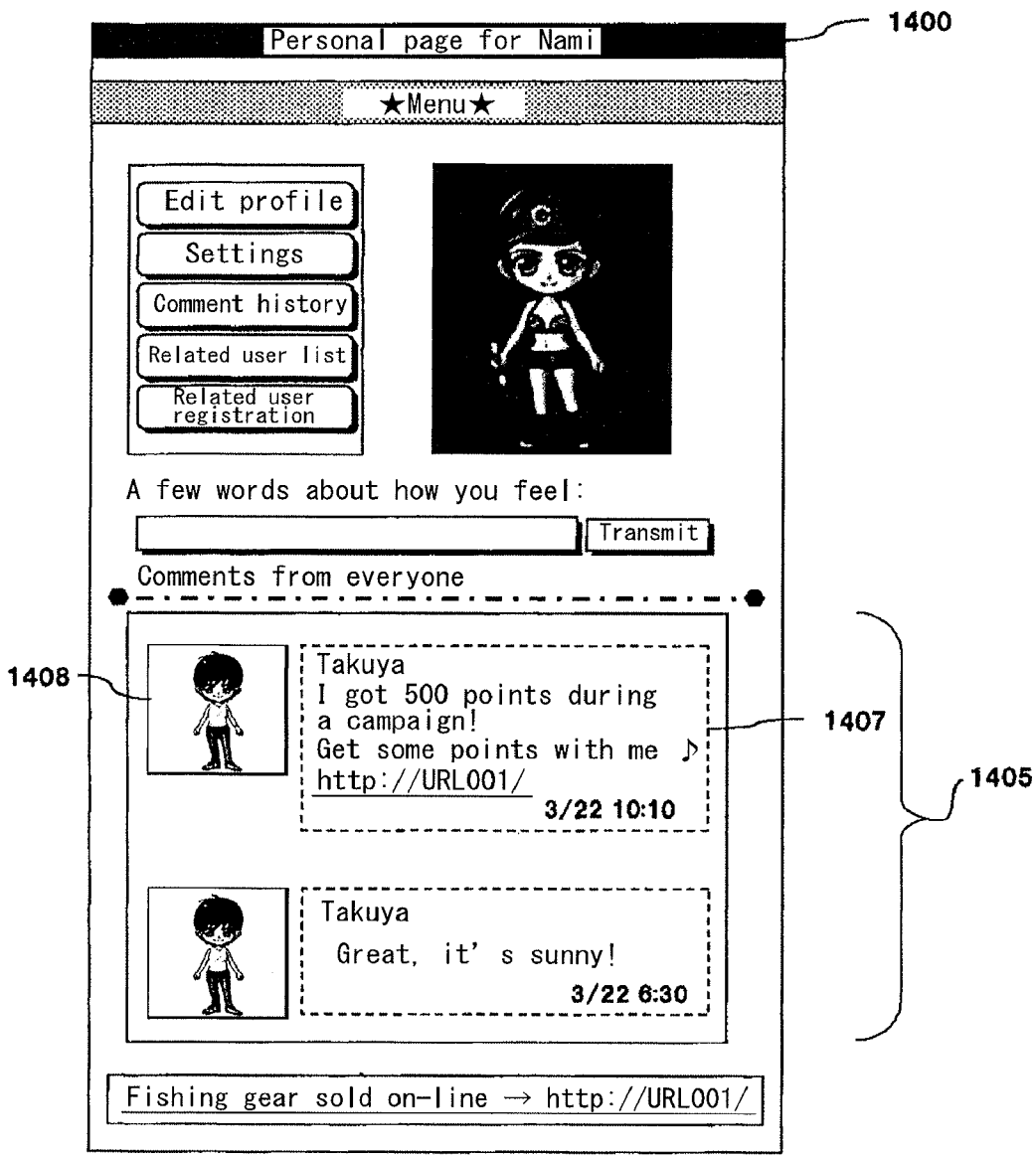
FIG. 14 illustrates an example of displaying an updated personal page of a related user according to Embodiment 1 of the present invention.

FIGS. 13 and 14 illustrate examples of a comment created in this way being displayed on personal pages. FIG. 13 illustrates a personal page 1300 for "Takuya". A comment 1307 stored in the comment management database 114 is displayed along with an avatar 1308 for Takuya in a comment display region 1305 of the personal page 1300. The created comment is newer than comment 1309 and therefore is displayed closer to the top of the comment display region 1310 than the comment 1309.

FIG. 14 illustrates a personal page 1400 for "Nami", a related user for Takuya. A created comment 1407 is displayed along with an avatar 1408 for Takuya in a comment display region 1405 of the personal page 1400. The created comment is newer than comment 1409 and therefore is displayed closer to the top of the comment display region 1405 than the comment 1409. When "Nami" views this comment, she can see the link information for the advertiser server 101 to which "Takuya" connected and learn that he retrieved 500 points. Furthermore, since the comment is displayed in the comment display region 605 at approximately the center of the personal page, the link information for the advertiser server 101 will not be overlooked.

(1.5) Effects of Advertisement Providing System of Embodiment 1

According to the advertisement providing system of Embodiment 1, when a certain member/user of the SNS executes transaction processing corresponding to reward applicable process on a commercial website provided by the advertiser server, a comment including link information to the advertiser server is created, without needing to be posted by hand, and is displayed on the personal page of any user registered as a related user of the certain member/user. Therefore, it is possible easily to provide advertisements that attract customers without members/users having to enter advertising copy and the like themselves.

In greater detail, when a performance notification is received from the advertiser server 101, link information for connecting to the commercial website provided by the advertiser server is included in the comment text data that the SNS site control unit 108 stores in the comment management database 114. For example, "http://URL001" within a comment is link information for connecting to the advertiser server 101 and can be clicked by the user via the communication terminal 100. Accordingly, since a related user viewing the comment on the personal page can easily retrieve the link information for connecting to the commercial website, the comment fulfills its role as an advertisement.

Furthermore, also including information on points that a member/user can earn by executing transaction processing corresponding to reward applicable process (such as information displaying the number of points, e.g. "500 points") creates an incentive for members/users to visit the advertiser's site using the link information and execute transaction processing. The advertisement in the comment can thus be afforded with an even better ability to attract customers. Moreover, since the comment is displayed as a comment by "Takuya", who is a related user, other users can recognize that a related user is using the advertiser's site, which lowers their psychological barrier against executing transaction processing on the advertiser's site. Accordingly, the advertising effect of the comment can be increased to the same level as a word-of-mouth advertising effect.

When "Nami", who is a related user, clicks on the link information in an automatic comment 1407 displayed on the personal page 1400, Nami's communication terminal 100 is connected to the advertiser server 101 (step S804), and subsequent steps S805 to S813 are executed in the same way. At this point, the performance reward control unit 112 may grant predetermined reward to "Takuya", who is the member/user corresponding to the automatic comment in FIG. 14 that served as the opportunity for Nami's communication terminal 100 to connect to the advertiser server 101. Thus granting reward to the member/user corresponding to the automatic comment when a related user connects to the advertiser server 101 can further increase the incentive for members/users to connect to the advertiser server, thereby allowing for more effective provision of advertisements.

(1.6) Modifications

While a method has been described in which receipt of a performance notification from the advertiser server 101 serves as the opportunity for automatic comment posting, this example is not limiting. For example, in Embodiment 1, transaction processing on a commercial website is described as reward applicable process, yet simply connecting to the advertiser server 101 may be reward applicable process. In this case, the following structure may be adopted. First, when the terminal device 100 connects to the advertiser server 101 by clicking on an advertising banner or the like (step S804), the performance reward control unit 112 retrieves the advertisement identifier associated with the advertising banner. The performance reward control unit 112 may store the advertisement identifier in the reward applicable process management database 115.

Furthermore, a performance notification received from the server of an advertisement service provider (ASP server) other than the advertiser server 101 may be treated as an opportunity for automatic comment posting. In the case of an intermediary ASP server, the communication terminal 100 first connects to the ASP server when the advertising banner is clicked, and a session ID is provided on the ASP server. The session ID is used for tracking. Subsequently, the communication terminal 100 connects (redirects) to the advertiser server 101. The performance notification from the advertiser server 101 is transmitted to the ASP server along with the session ID. Upon receiving the performance notification and the session ID, the ASP server identifies the user from the session ID and grants points to the identified user.

An example of displaying an avatar along with the comments in the comment display regions 1305, 1405, and the like has been illustrated, yet this example is not limiting. Alternatively, comments may be displayed alone.

Within the comments, "Takuya" is one piece of user information pertaining to the user identifier of the user who posted the comment. Other examples include the user's name or the like. Furthermore, the "500 points" in the comment represents the number of points granted for a connection request to the advertiser server and may be a different number.

While the granting of points has been described above, this example is not limiting. The granting of goods, services, or cash may be stored in the user management database 100. Image data or the like for decorating an avatar has exchange value on the SNS site, and alternatively the granting of such image data may be stored in the user management database 100.

Note that connection to the advertiser server in step S804 is executed by clicking on the advertising banner on the personal page of user "Takuya", yet connection is not limited in this way. Connection to the advertiser server may be executed by clicking on an advertising banner located on any page on the SNS site.

Furthermore, while the case of link information being included in advance in the comment text data has been described, the link information is not limited in this way. For example, the following structure may be adopted. First, comment text data that does not include link information is stored in the advertisement management table 1100. The SNS site control unit 108 retrieves both the comment text data and link information from the advertisement management table 1100 and amends the retrieved comment text data to add the link information. The SNS site control unit 108 then stores the amended comment text data in the comment management database 114.

(2) Embodiment 2

(2.1) Structure of SNS Server 1502

Figure 15:
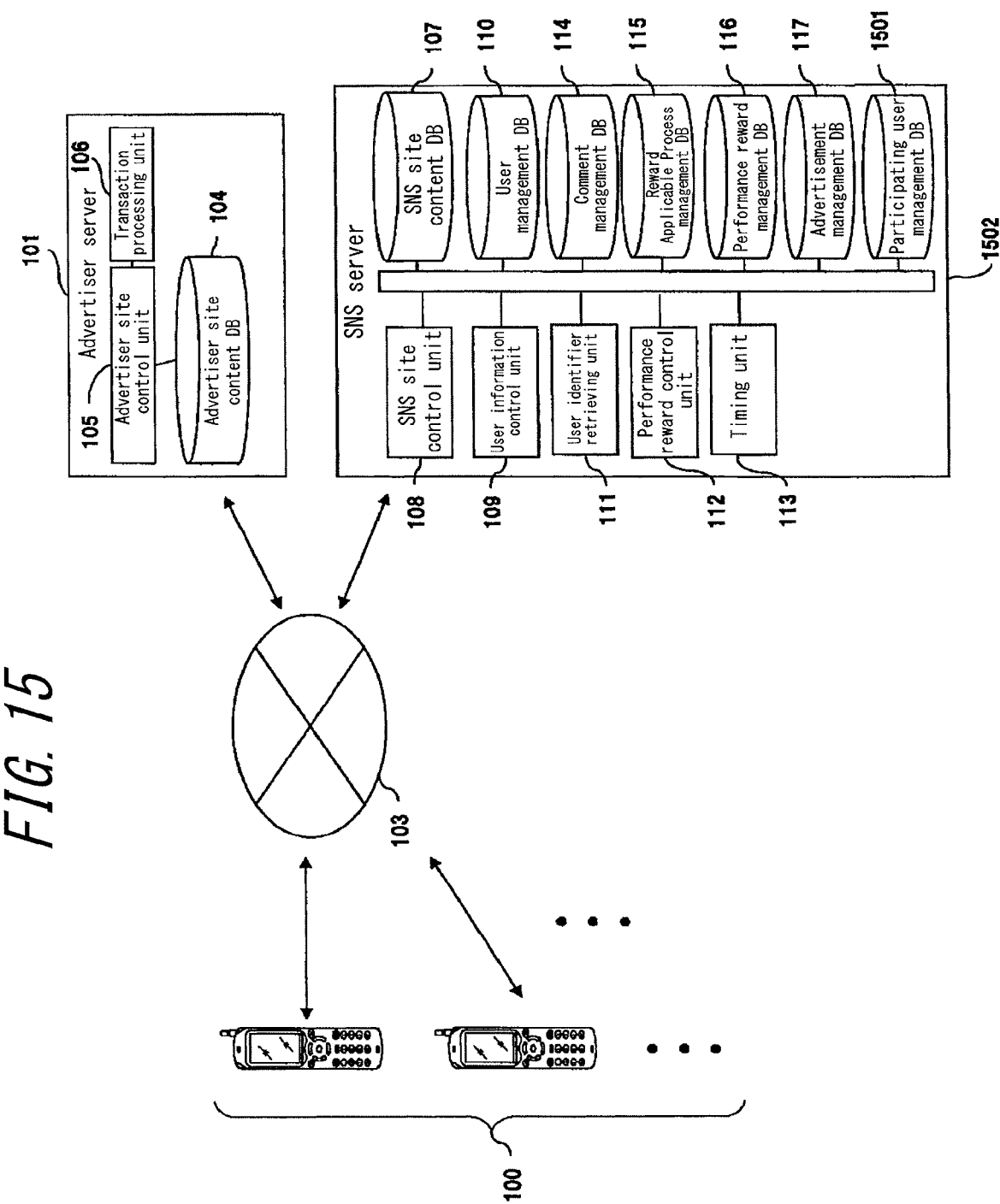
FIG. 15 is a block diagram illustrating the structure of Embodiment 2 of the present invention.

The following describes Embodiment 2 of the present invention. FIG. 15 is a block diagram illustrating the structure of Embodiment 2 of the present invention. Structures that are the same as in Embodiment 1 are provided below with the same labels, and a description thereof is omitted. In the advertisement providing system according to Embodiment 2, the SNS server 1502 includes a participating user management database 1501. Furthermore, in Embodiment 2, the advertising banner, text advertisement, and the like do not have associated therewith link information for connecting to the commercial website provided by the advertiser server, but rather link information for connecting to an intermediate page, described below. Also, the user is made to decide whether to execute automatic comment posting. In Embodiment 2, two types of points are provided: regular points and additional points. When predetermined conditions are satisfied, the additional points are also granted to a user. In Embodiment 2, two types of comment text data are also provided, and different wording is used for the automatic comment posting before and after predetermined conditions are satisfied.

The participating user management database 1501 stores the user identifier included in the performance notification and is used to manage, for each user identifier, whether automatic comment posting is to be executed for a predetermined advertisement identifier.

FIG. 16 illustrates a performance reward management table 1600 stored in the performance reward management database 801 of Embodiment 2. An advertisement identifier is stored in the first column 1601 of the performance reward management table 1600, the number of regular points is stored in the second column 1602, and the number of additional points is stored in the third column 1603. The number of points in Embodiment 2 is modified depending on the number of users of the communication terminal 100 who have executed transaction processing corresponding to reward applicable process (hereinafter referred to as the "number of participating users"). Specifically, when the number of participating users who participate in reward applicable process such as member registration on the advertiser's site reaches a certain number, each of the participating users is granted additional points in addition to the regular points. The performance reward management table 1600 is stored in advance at the time of system operation.

FIG. 17 illustrates an advertisement management table 1700 stored in the advertisement management database 117 of Embodiment 2. The advertisement management table 1700 stores, in association, an advertisement identifier, link information for connecting to the commercial website provided by the advertiser server, a starting period and an ending period, a prescribed number of participating users and a current number of participating users, and pre-satisfaction comment text data and post-satisfaction comment text data each made up of a predetermined character sequence. In Embodiment 2, the advertisement identifier is stored in the first column 1701 and the URL of the advertiser site is stored as the link information in the second column 1702 of the advertisement management table 1700. The starting period is stored in the third column 1703, and the ending period is stored in the fourth column 1704. The time periods designated by the starting period and the ending period are time period conditions for granting the regular points and the additional points. The number of participating users prescribed as a condition for granting the additional points (hereinafter referred to as "prescribed number of participating users") is stored in the fifth column 1705, and the current number of participating users, which indicates the number of participating users at the current point in time, is stored in the sixth column 1706. The pre-satisfaction comment text data is stored in the seventh column 1707, and the post-satisfaction comment text data is stored in the eighth column 1708. The pre-satisfaction comment text data is used for automatic comment posting before conditions for granting the additional points are satisfied (pre-satisfaction), whereas the post-satisfaction comment text data is used for automatic comment posting after conditions for granting the additional points have been satisfied (post-satisfaction).

FIG. 18 illustrates a participating user management table 1800 stored in the participating user management database 1501. An advertisement identifier is stored in the first column 1801 of the participating user management table 1800, and the user identifier included in a performance notification is stored in the second column 1802. Information indicating whether to allow execution of automatic comment posting by the SNS site control unit 108 is stored in the third column 1803. In the table, "accept" indicates acceptance of automatic comment posting, and "reject" indicates rejection of automatic comment posting. The granting status of additional points is stored in the fourth column 1804.

(2.2) Operations of Advertisement Providing System

Next, operations by the advertisement providing system in Embodiment 2 are described with reference to FIGS. 19 and 21.

Figure 19:
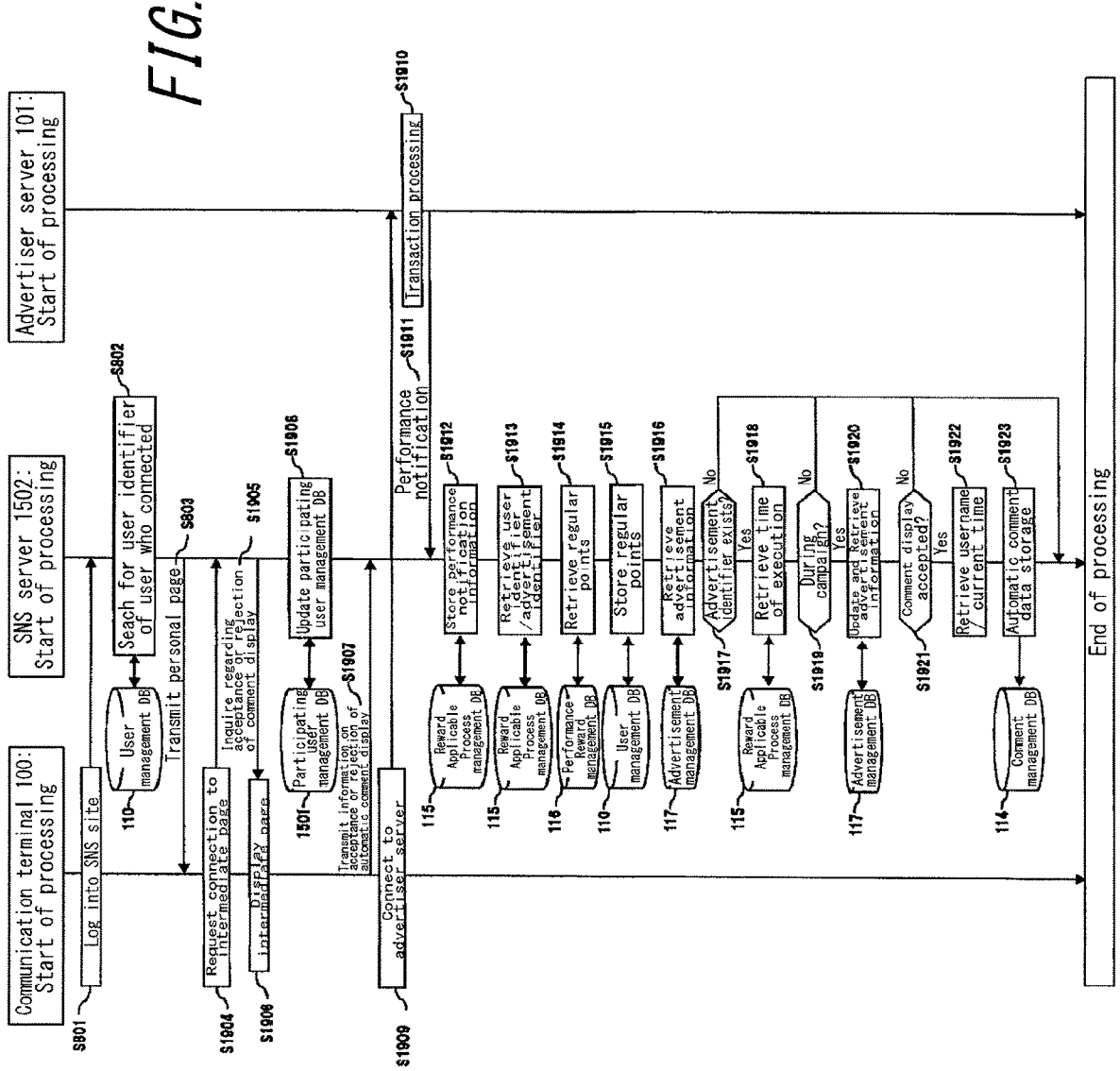
FIG. 19 is a flowchart illustrating operations of Embodiment 2 of the present invention.

(2.2.1) Operations by Advertisement Providing System for Granting of Regular Points and Automatic Comment Posting FIG. 19 illustrates operations for granting points by the advertisement providing system in Embodiment 2. Operations in FIG. 19 that are the same as in Embodiment 1 are provided with the same labels, and a description thereof is omitted.

In step S1904, the communication terminal 100 transmits a connection request to an intermediate page by a member/user clicking on an advertising banner or the like. At this point, the advertisement identifier for the advertising banner is also transmitted. Upon receiving the connection request, the SNS server 1502 transmits intermediate page data to the communication terminal 100 to ask the member/user whether to execute automatic comment posting (step S1905). The intermediate page is so named since it is displayed between a predetermined webpage on the SNS site on which an advertising banner, text advertisement, or the like is displayed and a predetermined webpage on the commercial website provided by the advertiser server 101.

Figure 20:
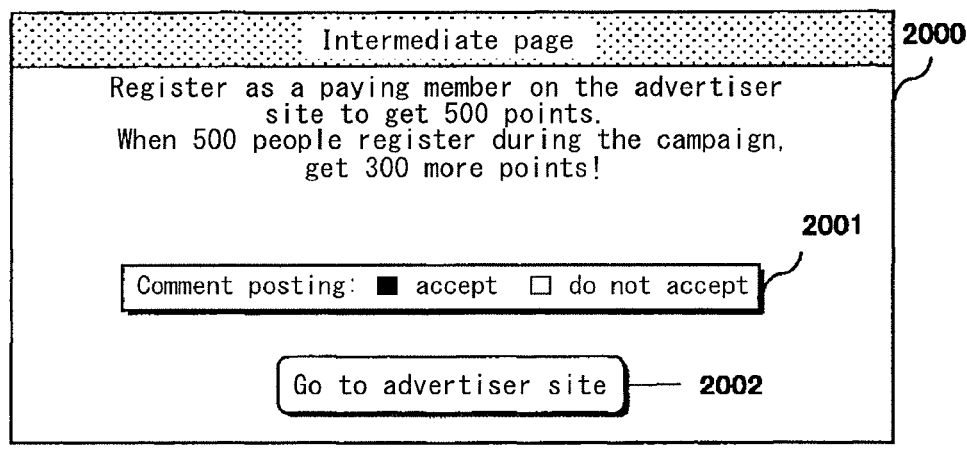
FIG. 20 illustrates an example of displaying an intermediate page according to Embodiment 2 of the present invention.

In step S1906, the intermediate page is displayed on the display of the communication terminal 100. FIG. 20 illustrates an example of the displayed intermediate page. An intermediate page 2000 is provided at least with a checkbox region 2001 and a movement button 2002 to the advertiser server 101. Link information to the advertiser server 101 is associated with the movement button 2002, which upon being clicked causes the communication terminal 100 to connect to the advertiser server 101. A checkbox for whether or not to accept automatic comment posting is provided in the checkbox region 2001. Based on the advertisement identifier, conditions for granting points pertaining to the advertisement are also displayed. Checking the "accept" checkbox so as to enter a checkmark indicates the intention to accept automatic comment posting, whereas checking the "do not accept" checkbox so as to enter a checkmark indicates the intention to reject automatic comment posting. In the intermediate page 2000 illustrated in FIG. 20, the checkbox to "accept" automatic comment posting has been clicked and is in a selected state. Note that the intermediate page may also have only an "accept" checkbox provided thereon.

Subsequently, in step S1907, when the member/user clicks on the movement button 2002 using the communication terminal 100, the communication terminal 100 transmits the advertisement identifier, the user identifier, and the information on acceptance or rejection of automatic comment posting to the SNS server 1502. Next, in step S1908, the performance reward control unit 112 stores the advertisement identifier, the user identifier, the acceptance or rejection of automatic comment posting, and the granting status of additional points in the participating user management database 1501. In this example, "AID001, "UID001", and "accept" are respectively stored as the advertisement identifier, the user identifier, and the acceptance or rejection of comment posting. Since additional points have not yet been granted at this time, a status of "not granted" is stored. Note that if the acceptance or rejection of comment posting in step S1907 is "do not accept", then "reject" is stored in the column for the acceptance or rejection of comment posting. Next, the communication terminal 100 connects to the advertiser server 101 (step S1909). After connection to the advertiser server 101, transaction processing is executed in step S1910, and in step S1911 a performance notification is transmitted to the SNS server 1502 either directly from the advertiser server or via a non-illustrated ASP server.

Upon receiving the performance notification, the performance reward control unit 112 stores information pertaining to the performance notification in the reward applicable process management database 115 in step S1912. Below, the performance notification is described as including a time "t1" as the time of execution of the transaction processing.

Next, in step S1913, the performance reward control unit 112 refers to the reward applicable process management database 115 to retrieve a combination of a user identifier and an advertisement identifier for which the reward granting status is "not granted". In this case, the user identifier "UID001" and the advertisement identifier "AID001" are retrieved as the combination for which the reward granting status is "not granted".

In the following step S1914, the performance reward control unit 112 refers to the performance reward management database 116 to retrieve the number of regular points for the advertisement identifier "AID001" for which the reward granting status was "not granted". In this case, the performance reward control unit 112 retrieves 500 points as the number of points for the advertisement identifier "AID001".

Next, in step S1915, the performance reward control unit 112 grants points to the user. Specifically, the performance reward control unit 112 adds the number of points retrieved in step S1914 to the points held by the user identifier "UID001" for which the performance notification was received. In other words, 500 points are added to the points of the user identifier "UID001" stored in the user management database 110. As a result, the number of points held by the user "Takuya" becomes 930.

Next, the SNS site control unit 108 refers to the advertisement management database 117 to retrieve information pertaining to the advertisement identifier "AID001" (step S1916). At this point, the SNS site control unit 108 retrieves the starting period and the ending period corresponding to the advertisement identifier retrieved in step S1913 and proceeds to step S1918.

The SNS site control unit 108 terminates processing when the advertisement identifier retrieved in step S1913 does not exist in the advertisement management database 117 (step S1916). In this case, since the advertisement identifier "AID001" is stored in the advertisement management database 117, processing proceeds to step S1917.

In the following step S1918, the SNS site control unit 108 refers to the reward applicable process management database 115 to retrieve the time of execution of the transaction processing. In this case, time "t1" is retrieved. Next, the SNS site control unit 108 compares the retrieved time of execution "t1" with the starting period and the ending period among the information pertaining to the advertisement identifier "AID001" retrieved in step S1915 (step S1919). Processing proceeds to step S1920 if "t1" is between the starting period and the ending period, whereas processing terminates if "t1" is earlier than the starting period or later than the ending period. "t1" is described here as being between the starting period and the ending period.

Next, in step S1920, the SNS site control unit 108 updates the information in the advertisement management database 115 and retrieves comment text data. Specifically, the SNS site control unit 108 updates the advertisement management table 1700 in the advertisement management database 115 by adding one to the current number of participating users in the table. In other words, in this example the current number of participating users for the advertisement identifier "AID001" is updated from 423 to 424. Furthermore, the SNS site control unit 108 compares the updated current number of participating users with the prescribed number of participating users. Upon comparison, if the current number of participating users is less than the prescribed number of participating users, the SNS site control unit 108 retrieves the pre-satisfaction comment text data in the seventh column 1707. At this point, the pre-satisfaction comment text data is retrieved by replacing the portion "(prescribed number of participating users—current number of participating users)" therein with the value resulting after subtracting the current number of participating users from the prescribed number of participating users. If the current number of participating users is equal to or greater than the prescribed number of participating users, the SNS site control unit 108 retrieves the post-satisfaction comment text data in the eighth column 1708. In this example, since the current number of participating users is 424, which is less than the prescribed number of participating users, i.e. 500, the following comment text data in the seventh column 1707 is retrieved: "I got 500 points during a campaign! More points after 76 more people register! Campaign lasts until 5/10, 22:00! Get some points with me http://URL001/".

Next, in step S1921, based on the information on acceptance or rejection of automatic comment posting stored in the participating user management database 1501 in step S1908, the SNS site control unit 108 proceeds to step S1922 when automatic comment posting has been accepted. Conversely, processing terminates when automatic comment posting has been rejected. Next, in step S1922, the SNS site control unit 108 refers to the user management database 110 to retrieve the username corresponding to the user identifier and refers to the timing unit 113 to retrieve the current time as the post time. Finally, in step S1923, the SNS site control unit 108 stores automatic comment data including the user identifier, the username, the post time, and the comment text data retrieved in step S1919 in the comment management database 114. By storing the automatic comment data that includes the comment text data in the comment management database, "I got 500 points during a campaign! 300 more points after 76 more people register! Campaign lasts until 5/10, 22:00! Get some points with me http://URL001" is displayed on the personal page of the user "Takuya" and of his related users.

(2.2.2) Operations for Granting of Additional Points

Figure 21:
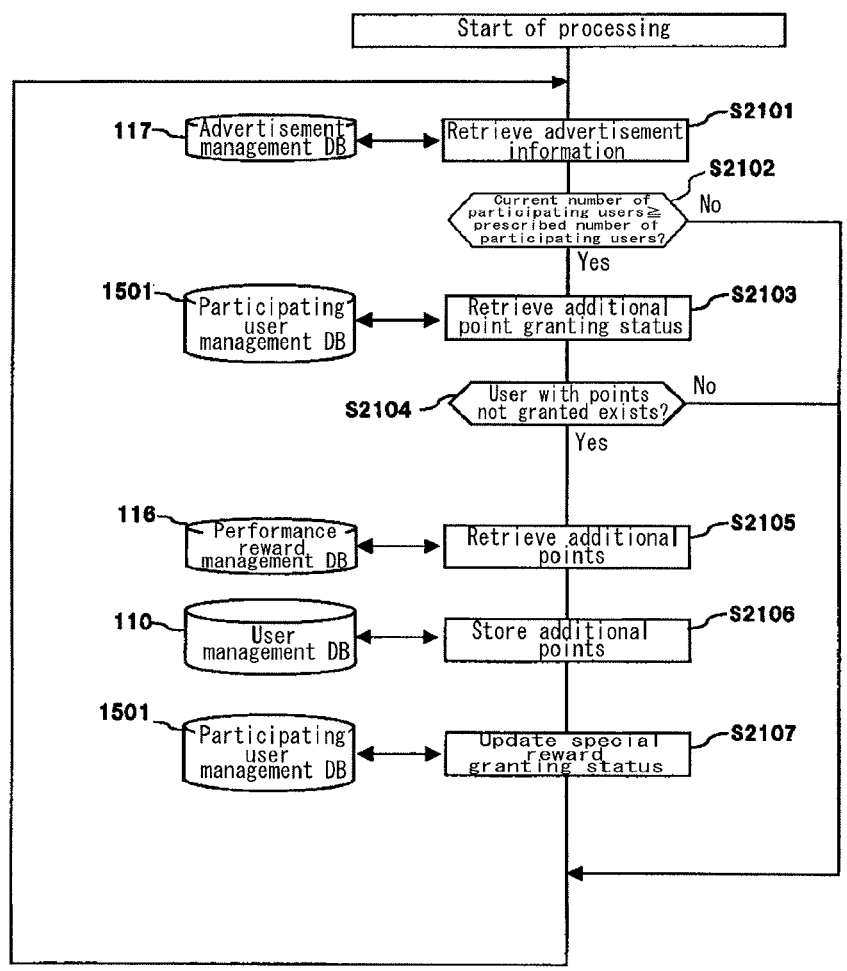
FIG. 21 is a flowchart illustrating operations related to granting additional performance reward according to Embodiment 2 of the present invention.

Next, FIG. 21 illustrates operations for granting additional points by the advertisement providing system in Embodiment 2. These operations are executed for all advertisement identifiers. Below, an example of operations for the advertisement identifier "AID001" is described, yet operations are executed similarly for other advertisement identifiers as well. Furthermore, the operations are periodically repeated by the SNS server 1502.

First, in step S2101, the performance reward control unit 112 retrieves information on the advertisement identifier "AID001" stored in the advertisement management database 117. Specifically, in the subsequent step S2102, based on the retrieved information, the performance reward control unit 112 compares the current number of participating users and the prescribed number of participating users for the advertisement corresponding to each advertisement identifier to determine whether the current number of participating users is equal to or greater than the prescribed number of participating users. Upon comparison, if the current number of participating users is equal to or greater than the prescribed number of participating users, processing proceeds to step S2103. If the current number of participating users is less than the prescribed number of participating users, processing returns to step S2101, and similar processing is executed for another advertisement identifier.

Next, in step S2103, the performance reward control unit 112 refers to the participating user management database 1501 to retrieve the granting status of additional points for the advertisement identifier "AID001". In the following step S2104, the performance reward control unit 112 determines whether a user to whom additional points have not been granted exists, and if so, processing proceeds to step S2105. Conversely, when no user to whom additional points have not been granted exists, processing returns to step S2101, and similar processing is executed for another advertisement identifier. Based on the participating user management table 1800 in the participating user management database 1501, additional points have not been granted for AID001 to users "UID001" and "UID002", and therefore processing proceeds to step S2105.

In the following step S2105, the performance reward control unit 112 refers to the performance reward management database 116 to retrieve the number of additional points for the advertisement identifier "AID001" for which the reward granting status was "not granted". Based on the third column 1603 in the performance reward management table 1600, the performance reward control unit 112 retrieves 300 points as the number of additional points for the advertisement identifier "AID001".

Next, in step S2106, the performance reward control unit 112 grants the additional points to users. Specifically, the performance reward control unit 112 adds the number of additional points retrieved in step S2105 to the points held by the user identifiers "UID001" and "UID002" for which the performance notification was received. In other words, 300 points are added as additional points to the points of both user identifiers "UID001" and "UID002" stored in the user management database 110.

Next, in step S2107, the performance reward control unit 112 updates the reward granting status in the participating user management database 1501 to "granted" for the user identifiers to which additional points were granted. FIG. 22 illustrates an updated participating user management table 2200. As illustrated in FIG. 22, the additional reward granting status in the fourth column 2204 is updated.

Once step S2107 is complete, processing returns to step S2101, and similar processing is subsequently repeated periodically for each advertisement identifier.

(2.3) Effects of Advertisement Providing System of Embodiment 2

In this way, in the advertisement providing system of Embodiment 2, the difference between the prescribed number of participating users and the current number of participating users, i.e. the remaining number of people until reaching the prescribed number of participating users, is listed in a comment. The number of additional points when the current number of participating users reaches the prescribed number of participating users is also listed in the comment. Therefore, in addition to a similar effect to word-of-mouth, users can quantitatively grasp the degree of interest of other users in the advertiser's site and can earn additional points when certain conditions are satisfied, thereby even further heightening the ability to attract customers.

On the other hand, when automatic comment posting has been rejected based on the information stored in the participating user management database 1501, processing terminates without a comment being displayed.

Since users are thus asked whether to accept execution of automatic comment posting, users who do not wish to display information regarding their transactions can reject automatic comment posting, which is useful when users wish to guard their privacy.

In Embodiment 2 above, an advertisement identifier, a number of regular points, and a number of additional points are stored in association in the performance reward management table 1600, as illustrated in FIG. 16, but this example is not limiting. For example, a first advertisement identifier for regular points and a second advertisement identifier for additional points may be allocated for one advertisement, with only one type of points being associated with one advertisement identifier in the performance reward management table 1600. As the number of points to be granted, the performance reward control unit 112 may then retrieve the number of points associated with the first advertisement identifier when granting regular points and retrieve the number of points associated with the second advertisement identifier when granting additional points.

(3) Embodiment 3

(3.1) Structure of Advertisement Providing System of Embodiment 3

The following describes Embodiment 3 of the present invention. Embodiment 3 describes the case in which the communication terminal 100 connects to the advertiser server 101 without going through the SNS server 102 and executes transaction processing corresponding to reward applicable process on the commercial website provided by the advertiser server 101. Specifically, in the advertisement providing system of Embodiment 3, the commercial website is configured by a webpage for purchasing goods or the like in which link information to the SNS server 1502 is included. The remaining structure is the same as Embodiment 1 of the present invention, and therefore a description thereof is omitted.

(3.2) Operations of Advertisement Providing System of Embodiment 3

Figure 24:
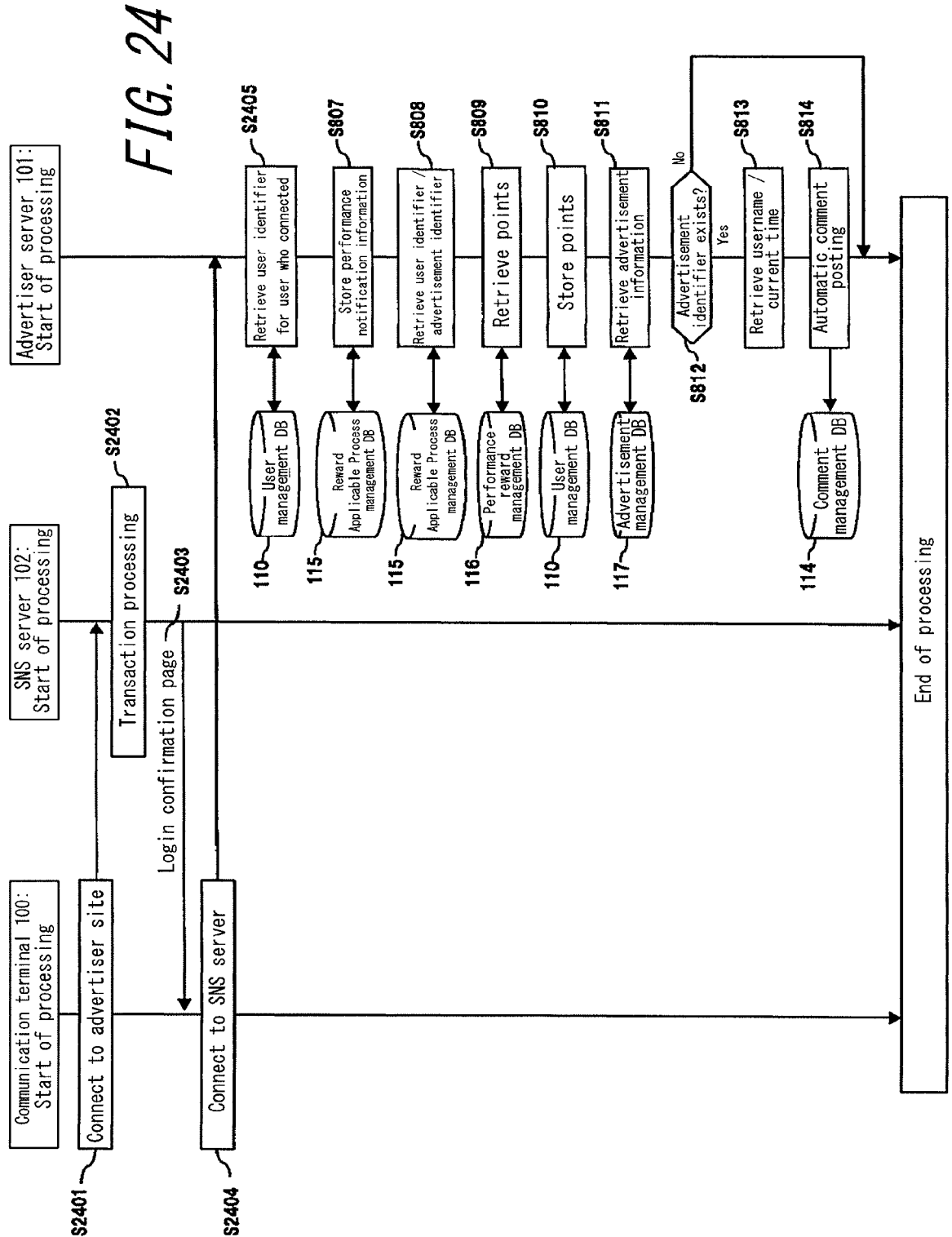
FIG. 24 is a flowchart illustrating operations of Embodiment 3 of the present invention.

Operations by the advertisement providing system in Embodiment 3 are described with reference to FIG. 24. In step S2401, the communication terminal 100 connects to the advertiser server 101 based on input by the member/user and displays a predetermined webpage for purchasing goods or the like. Next, the transaction processing unit 106 of the advertiser server 101 executes transaction processing with the communication terminal 100 (step S2402). Upon completion of the transaction processing, the advertiser server 101 transmits a login confirmation page to the communication terminal (step S2403). The login confirmation page is, for example, provided with a login information input region for inputting login information necessary to log into the SNS site (user identifier, username, e-mail address, or the like, together with a password), a checkbox region for the user to select whether to accept automatic comment posting, and a movement button with which link information to the SNS server 102 is associated. In this example, the advertiser server 101 is an advertiser server pertaining to an advertisement identified by the advertisement identifier "AID001".

Subsequently, in step S2404, the communication terminal 100 connects to the SNS server 102 based on the user clicking the movement button, and in the following step S2405, based on the user management database 110, the SNS site control unit 108 retrieves the user identifier of the communication terminal 100 that connected to the SNS server 102. In this example, the user of the connecting communication terminal 100 is the member/user "Takuya".

If the input login information (user identifier, username, e-mail address, or the like, together with a password) is correct, processing proceeds to step S807. Processing from step S807 onwards is the same as in steps S807 through S814 in Embodiment 1.

(3.3) Effects of Advertisement Providing System of Embodiment 3

Link information to the SNS server 102 is thus placed on the webpage for purchasing goods or the like provided by the advertiser server, and the SNS site control unit 108 of the SNS server 102 executes automatic comment posting upon connection to the SNS server 102 using this link information. As a result, even if a member/user executes transaction processing when visiting the advertiser server 101 directly, without going through the SNS server 102, the SNS server 102 can execute automatic content posting. Users other than a user who executes the transaction processing by utilizing link information to the advertiser server 102 provided in the SNS site can therefore be targeted for automatic comment posting, thereby increasing the number of automatically posted comments and further heightening the advertising effect of the advertisements.

The present invention has been described based on the drawings and on examples, yet it should be noted that a person of skill in the art could easily make a variety of modifications and adjustments based on the present disclosure. Accordingly, these modifications and adjustments are to be understood as included in the scope of the present invention. For example, the functions and the like included in the various members, units, and steps may be reordered in any logically consistent way. Furthermore, units, steps, and the like may be combined into one or divided.

REFERENCE SIGNS LIST

100: Communication terminal
101: Advertiser server
102: SNS server
103: Internet
104: Advertiser site content database
105: Advertiser site control unit
106: Transaction processing unit
107: SNS site content database
108: SNS site control unit
109: User information control unit
110: User management database
111: User identifier retrieving unit
112: Performance reward control unit
113: Timing unit
114: Comment management database
115: Reward applicable process management database
116: Performance reward management database
117: Advertisement management database
200: User management table
201-207: First to seventh columns
400: Comment management table
401-405: First to fifth columns
600, 700, 1300, 1400: Personal page
601, 701, 1301, 1401: Avatar display region
602, 702, 1302, 1402: Menu region
603, 703, 1303, 1403: Comment input form
604, 704, 1304, 1404: Transmission button
605, 705, 1305, 1405: Comment display region
606, 706, 1306, 1406: Advertisement display region
607, 708, 1311, 1307, 1309, 1407: Comment
609, 710, 1312, 1308, 1310, 1408: Avatar
900: Performance targeted processing management table
901-904: First to fourth columns
1000: Performance reward management table
1001-1002: First and second columns
1100: Advertisement management table
1101-1103: First to third columns
1200: Comment management table
1501: Participating user management database
1600: Performance reward management table
1601-1603: First to third columns
1700: Advertisement management table
1701-1708: First to eighth columns
1800: Participating user management table
1801-1804: First to fourth columns
2000: Intermediate page
2001: Checkbox region
2002: Link information
2200: Participating user management table
2300: Comment management table

The invention claimed is:

1. An advertisement providing system comprising:
a first server configured to provide a commercial website for executing a commercial transaction;
a second server;
a first communication terminal configured to connect to the second server; and
a second communication terminal configured to connect to the first server;
wherein the second server comprising:
a user management database configured to store a first user identifier received from the first communication terminal in association with a second user identifier received from the second communication terminal; and
a controller configured to cause a display provided in the first communication terminal to display content data by transmitting the content data to the first communication terminal;
wherein, when the second communication terminal executes predetermined processing on the commercial website provided by the first server, the first server transmits link information to the second communication terminal,
wherein the second communication terminal connects to the second server via the link information provided by the first server,
wherein the controller of the second server receives login information which is sent from the second communication terminal when the second communication terminal connects to the second server via the link information,
wherein the login information includes the second user identifier, and
wherein, when the login information is correct, the controller:
identifies the first user identifier that is associated with the second user identifier included in the login information; and
transmits, as the content data, comment data including user information pertaining to a user of the second user identifier and commercial website link information for the commercial website to the first communication terminal based on the identified first user identifier,
wherein the second server further comprises a performance reward controller configured to control performance reward, wherein the user management database stores the second user identifier in association with the performance reward granted to the second user identifier,
wherein the performance reward controller adds a first performance reward to the performance reward granted to the second user identifier when the login information is received,
wherein the controller of the second server is configured to automatically post, on the display relating to a user of the first user identifier, the user information pertaining to the user of the second user identifier and the comment data including information pertaining to the first performance reward that is granted to the second user identifier such that the comment data is displayed as a comment posted by the second user identifier.

2. The advertisement providing system according to claim 1, wherein the controller transmits an inquiry to the second communication terminal as to whether permission for transmitting the comment data to the first communication terminal is granted, and
wherein the controller transmits the comment data to the first communication terminal as the content data upon receiving the login information when, as a result of the inquiry, permission for transmitting the comment data to the first communication terminal is granted.

3. The advertisement providing system according to claim 2, wherein the performance reward controller adds a second performance reward to the performance reward granted to the second user identifier when a predetermined condition is satisfied.

4. The advertisement providing system according to claim 3, wherein the second performance reward is further included in the comment data.

5. The advertisement providing system according to claim 3, wherein the predetermined condition is that a total number of communication terminals executing the predetermined processing on the commercial website reaches a predetermined number.

6. The advertisement providing system according to claim 3, wherein the predetermined condition is that the first communication terminal connects to the commercial website based on the commercial website link information included in the comment data transmitted to the first communication terminal and the first communication terminal executes predetermined processing on the commercial website.

7. A second server, the second server being connected with a first server that provides a commercial website for executing a commercial transaction and with a first communication terminal, the second server comprising:
  a user management database configured to store a first user identifier received from the first communication terminal in association with a second user identifier received from a second communication terminal that connects to the first server;
  a controller configured to cause a display provided in the first communication terminal to display content data by transmitting the content data to the first communication terminal; and
  a receiver configured to receive a link information when the second communication terminal connects to the second server via the link information, the link information being transmitted from the first server to the second communication terminal when the second communication terminal executes predetermined processing on the commercial website provided by the first server,
  wherein the controller of the second server receives login information which is sent from the second communication terminal when the second communication terminal connects to the second server via the link information,
  wherein the login information includes the second user identifier, and
  wherein, when the login information is correct, the controller:
    identifies the first user identifier that is associated with the second user identifier included in the login information, and
    transmits, as the content data, comment data including user information pertaining to a user of the second user identifier and commercial website link information for the commercial website to the first communication terminal based on the identified first user identifier,
  wherein the second server further comprises a performance reward controller configured to control performance reward,
  wherein the user management database stores the second user identifier in association with the performance reward granted to the second user identifier,
  wherein the performance reward controller adds a first performance reward to the performance reward granted to the second user identifier when the login information is received,
  wherein the controller of the second server is configured to automatically post, on the display relating to a user of the first user identifier, the user information pertaining to the user of the second user identifier and the comment data including information pertaining to the first performance reward that is granted to the second user identifier such that the comment data is displayed as a comment posted by the second user identifier.

8. A method for advertisement providing in an advertisement providing system, the system comprising a first server, a second server, a first communication terminal that connects to the second server, and a second communication terminal that connects to the first server, the method comprising the steps of:
  the second server storing a first user identifier received from the first communication terminal in association with a second user identifier received from the second communication terminal;
  the first server transmitting link information to the second communication terminal when the second communication terminal executes predetermined processing on the commercial website provided by the first server and the second communication terminal connecting to the second server via the link information provided by the first server;
  the second server receiving login information which is sent from the second communication terminal when the second communication terminal connects to the second server via the link information,
  wherein the login information includes the second user identifier,
  wherein, when the login information is correct, the second server identifying the first user identifier that is associated with the second user identifier included in the login information upon receipt of the login information; and the second server transmitting comment data including user information pertaining to a user of the second user identifier and commercial website link information for the commercial website to the first communication terminal the identified first user identifier, and causing a display provided in the first communication terminal to display the comment data,
  wherein the second server further comprises a performance reward controller configured to control performance reward,
  wherein the user management database stores the second user identifier in association with the performance reward granted to the second user identifier,
  wherein the performance reward controller adds a first performance reward to the performance reward granted to the second user identifier when the login information is received,
  wherein the second server automatically posts on the display relating to a user of the first user identifier the user information pertaining to the user of the second user identifier and the comment data including information pertaining to the first performance reward that is granted to the second user identifier such that the comment data is displayed as a comment posted by the second user identifier.

9. The advertisement providing system according to claim 1, wherein the performance reward controller adds the first performance reward to the performance reward granted to the second user identifier when the login information is received, and when a predetermined condition is satisfied, the predetermined condition comprises the first communication terminal connecting to the commercial website based on the commercial website link information included in the comment data transmitted to the first communication terminal.

* * * * *